(12) United States Patent
Hotta

(10) Patent No.: US 8,797,638 B2
(45) Date of Patent: Aug. 5, 2014

(54) WAVELENGTH SELECTIVE OPTICAL SWITCH DEVICE AND METHOD OF CONTROLLING CHARACTERISTICS THEREOF

(71) Applicant: Santec Corporation, Aichi (JP)

(72) Inventor: Yuji Hotta, Aichi (JP)

(73) Assignee: Santec Corporation, Aichi (JP)

( * ) Notice: Subject to any disclaimer, the term of this patent is extended or adjusted under 35 U.S.C. 154(b) by 57 days.

(21) Appl. No.: 13/632,937

(22) Filed: Oct. 1, 2012

(65) Prior Publication Data

US 2014/0016182 A1    Jan. 16, 2014

(30) Foreign Application Priority Data

Jul. 13, 2012  (JP) .................. 2012-157518

(51) Int. Cl.
| | |
|---|---|
| G02F 1/29 | (2006.01) |
| G02F 1/01 | (2006.01) |
| G02F 1/03 | (2006.01) |
| G02B 5/04 | (2006.01) |
| G02B 27/10 | (2006.01) |
| H04J 14/00 | (2006.01) |

(52) U.S. Cl.
USPC ........... 359/320; 359/279; 359/245; 359/615; 359/618; 359/316; 359/318; 398/45; 398/48; 398/34

(58) Field of Classification Search
CPC .............. G02F 1/29; G02F 1/00; G02B 27/10
USPC ......... 359/245, 279, 315, 316, 318, 320, 322, 359/569, 572, 615, 618; 398/28, 29, 34, 45, 398/46, 48, 68; 385/3, 16, 17, 24; 349/113, 349/196
See application file for complete search history.

(56) References Cited

U.S. PATENT DOCUMENTS

| | | | |
|---|---|---|---|
| 6,707,959 B2 | 3/2004 | Ducellier et al. | |
| 6,891,676 B2 * | 5/2005 | Ford et al. | 359/572 |
| 7,145,710 B2 * | 12/2006 | Holmes | 359/279 |
| 7,162,115 B2 | 1/2007 | Brophy et al. | |
| 7,397,980 B2 | 7/2008 | Frisken | |
| 7,457,547 B2 | 11/2008 | Frisken et al. | |
| 7,612,930 B2 * | 11/2009 | Holmes | 359/279 |
| 7,626,754 B2 * | 12/2009 | Reimer | 359/325 |
| 7,787,720 B2 * | 8/2010 | Frisken et al. | 385/16 |
| 8,089,683 B2 * | 1/2012 | Holmes | 359/279 |
| 8,335,033 B2 * | 12/2012 | Holmes | 359/279 |
| 8,437,634 B2 * | 5/2013 | Sakurai | 398/45 |
| 2006/0067611 A1 | 3/2006 | Frisken et al. | |
| 2013/0128215 A1 * | 5/2013 | Sakurai | 349/196 |

* cited by examiner

*Primary Examiner* — Loha Ben
(74) *Attorney, Agent, or Firm* — Osha Liang LLP

(57) ABSTRACT

A wavelength selective optical switch device includes an incidence and exit part where a signal beam made of light of a multiplicity of wavelengths enters and a signal beam of a selected wavelength exits, a wavelength dispersion element that spatially disperses a signal beam according to the wavelength thereof and multiplexes reflected light, a condensing element that condenses the light dispersed by the wavelength dispersion element onto a two-dimensional plane, and a wavelength selection element that uses a multilevel optical phased array arranged in a position to receive incident light developed on an xy-plane made of an x-axis direction and a y-axis direction perpendicular thereto developed according to a wavelength, having a multiplicity of pixels arrayed in a lattice on the xy-plane, and that cyclically changes the phase shift amount in the y-axis direction to a sawtooth wave pattern for each pixel on the x-axis.

20 Claims, 20 Drawing Sheets

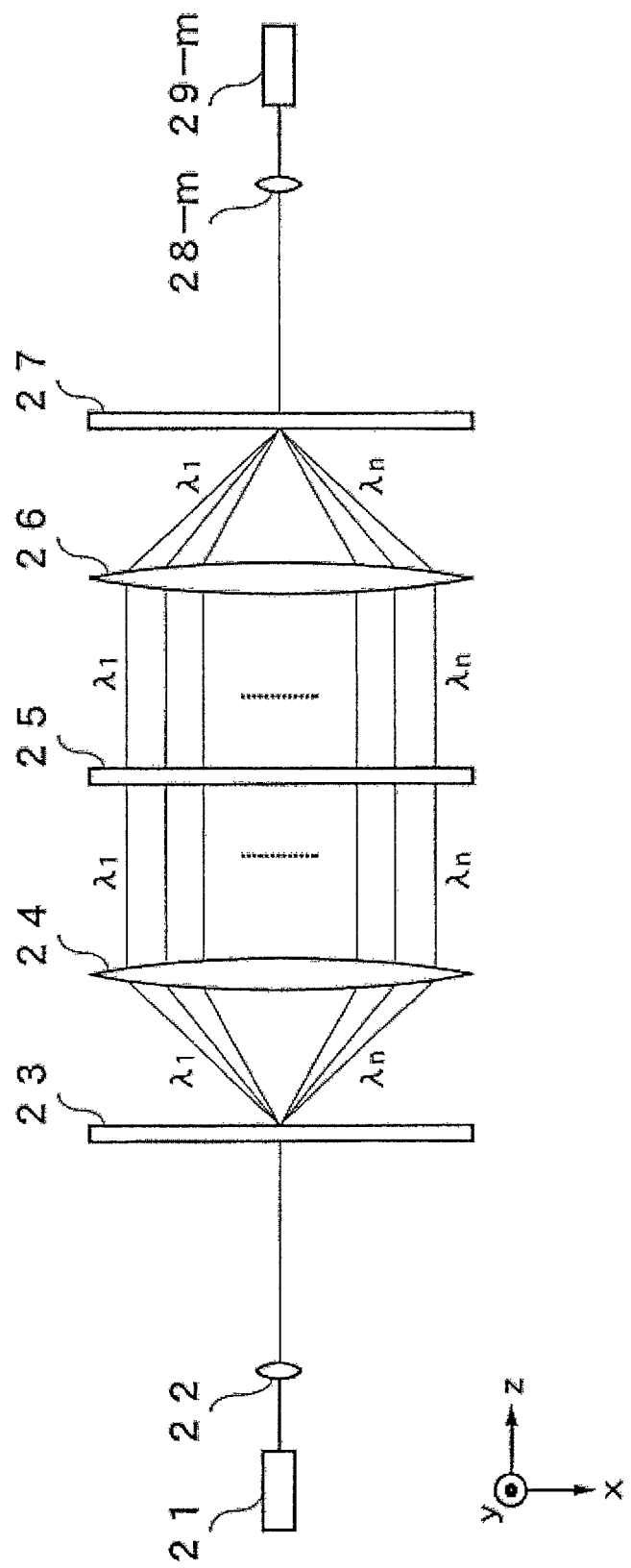

WAVELENGTH SELECTIVE OPTICAL SWITCH DEVICE AND METHOD OF CONTROLLING CHARACTERISTICS THEREOF

FIELD OF THE INVENTION

The present invention relates to a wavelength selective optical switch device used in a node or the like of an optical communication system, and a method for controlling characteristics thereof

DESCRIPTION OF THE RELATED ART

In high speed large capacity optical networks that support today's advanced information and communication firms, wavelength multiplexing optical communication technology is used. Reconfigurable optical add drop multiplexers (ROADM) that provide reconfigurable add drop functionality are being introduced into optical nodes that correspond to branching points of an optical network. Wavelength selective switches (also referred to as WSS) that switch any wavelength to any direction are garnering attention in the implementation of ROADM devices. An optical beam deflection element is used in wavelength selective switches to select a wavelength that deflects an optical beam to a desired output port. Patent Documents 1 and 2 propose using mechanical displacement of a MEMS (micro-electro-mechanical system) mirror array as an optical beam deflection element, and Patent Documents 3, 4, and 5 propose using a diffraction phenomenon that accompanies use of a LCOS (liquid crystal on silicon) element.

Meanwhile, optical networks have become more complicated with advancements in research and development in accelerating transmission rates and new modulation formats in response to demand for transmission capacity in recent years. Dynamic control and functionality, such as shifts in passband centered wavelengths, the magnification and reduction of a passband and the like, is desired in this type of optical network in addition to conventional wavelength selective functionality to implement optimal filtering for transmission rates and modulation formats of various optical signals.

This functionality uses various WDM signal channels, which is to say, a high definition LCOS element of a MEMS mirror array or the like that assigns a plurality of pixels to lights of differing wavelengths and can be implemented by using a multilevel optical phased array in the deflection of an optical beam.

FIG. 1(a) illustrates a LCOS element 101 in which wavelengths are dispersed in the x-axis direction and light having identical wavelengths with dispersed optical intensity is incident in the y-axis direction and the respective wavelengths are reflected in different directions. FIG. 2 illustrates optical fiber 102 that provides incident light having wavelength dispersed to the x-axis direction of the LCOS element 101 and optical fibers 103, 104, and 105 that receive reflected light reflected in respectively different directions. Note that the illustration in FIG. 2 omits the optical system for dispersing wavelengths in the x-axis direction and dispersing light intensity at identical wavelengths in the y-axis direction and the optical system for condensing light that has been dispersed in the y direction and returning it to the optical fiber 103, 104, and 105 for output.

In FIG. 1(a), an LCOS element 101 is divided along the x-axis and light having a wavelength content added to region R1, light having a wavelength content added to region R2, and light having a wavelength content added to region R3 are reflected in three different directions respectively, and the reflected light enters into optical fibers 103 to 105 in different positions as illustrated in FIG. 2. At this time, the pixels positioned in region R1 are controlled irrespective of their position on the x-axis so as to change the phase shift amount to a sawtooth wave pattern as illustrated in FIG. 1(b) for any of the 7 pixel units along the y-axis direction. Furthermore, in region R2, the phase shift is made to be 0 without providing voltage, and the pixels positioned in region R3 are controlled so as to change the phase shift amount to a sawtooth wave pattern in 5 pixel cycle along the y-axis direction. Thus, providing a sawtooth wave shaped phase pattern of different cycles in regions R1, R2, and R3 of the LCOS element 101 enables incidence light from different directions to be reflected and allows it to be output to optical fiber 103, 104, and 105 in different wavelengths.

FIG. 3(a) illustrates the same LCOS element 101 as FIG. 1(a) having the x-axis in a horizontal direction, and corresponding to this, FIG. 3(b) illustrates a wavelength band that corresponds to the x-coordinate incident to the optical fiber 103 to 105. Thus, by applying different phase patterns to pixels of three regions of the LCOS element 101, a wavelength can be selected thereby enabling optical switching.

DOCUMENTS OF THE RELATED ART

Patent Documents

[Patent Document 1] U.S. Pat. No. 7,162,115B2
[Patent Document 2] U.S. Pat. No. 6,707,959B2
[Patent Document 3] US 2006/0067611A1
[Patent Document 4] U.S. Pat. No. 7,397,980B2
[Patent Document 5] Japanese Unexamined Patent Application No. 2012-108346

With this type of wavelength selective device that uses a multilevel optical phased array, wavelength selection can be performed in pixel units by a pixel unit device. However, selection of high resolution wavelengths at one pixel unit or below has been impossible. Moreover, when a LCOS element is used as a wavelength selective element, there is the problem that optical beams that have entered into pixels cannot be deflected as intended due to a fringe effect between neighboring pixels which causes the wavelength selection to narrow.

Next, fringe effect and the cause of its occurrence will be explained. For example, when examining the four pixels at the boundary of the right ends of regions R1 and R2 of FIG. 1(a), there are reflective electrodes 111-1 to 111-4 for each pixel on the circuit board 110 of the LCOS element 101 as illustrated in FIG. 4, and on top of that, a transparent electrode 112 is placed. Also, because the LCOS element part has a pixel 111-2 to which voltage is applied adjacent to pixel 111-3 where it is not applied, a line of electric force can be generated from pixel 111-2 to pixel 111-3. Accordingly, light incident to pixels on the boundary experience a drop in the level of light that reflects in a specific direction. Therefore, as illustrated in FIG. 3(c), there is a problem in that the selected wavelength band that are to be applied to the optical fiber 103 is wider while the selected wavelength bands that are to be applied to optical fibers 104 and 105 are narrower.

In addition, FIG. 5(a) illustrates one portion of regions R1 and R2, and FIG. 5(b) illustrates a enlarged wavelength of output light from two optical fibers that correspond to this. Here, in regions R1 and R2, when region R1 is enlarged 1 pixel amount in the x-axis direction and region R2 is reduced, the wavelength range of the output of optical fiber is larger for region R1 while the wavelength band to the optical fiber for region 2 can be reduced as illustrated in FIG. 6(b). However, control of these is possible only by 1 pixel unit.

SUMMARY OF THE INVENTION

One or more embodiments of the present invention is configured at least in part in view of the problems in this type of conventional multilevel optical phased array and has technical aspects to enable wavelength selection at one pixel unit or less and to be able to control wavelength selection by a pixel unit or less.

One or more embodiments of the present invention may be a wavelength selective optical switch device that includes an incidence and exit part where a signal beam made of light of a multiplicity of wavelengths enters and a signal beam of a selected wavelength exits; a wavelength dispersion element that spatially disperses a signal beam according to the wavelength thereof and multiplexes reflected light; a condensing element that condenses the light dispersed by the wavelength dispersion element onto a two-dimensional plane; a wavelength selection element that uses a multilevel optical phased array arranged in a position to receive incident light developed on an xy-plane made of an x-axis direction and a y-axis direction perpendicular thereto developed according to a wavelength, having a multiplicity of pixels arrayed in a lattice on the xy-plane, and that cyclically changes the phase shift amount in the y-axis direction to a sawtooth wave pattern for each pixel on the x-axis; and a wavelength selection element drive part that drives an electrode for each pixel arrayed in an xy direction of the wavelength selection element, generates a composite wave of two or more sawtooth waves along the y-axis for all pixels on the y-axis that have an x-coordinate common with at least one pixel on the x-axis, changes a phase shift amount according to such composite wave, and reflects light of a wavelength applied to that pixel in a plurality of directions.

One or more embodiments of the present invention may be a wavelength selective optical switch device that includes an incidence part where a signal beam made of light of a multiplicity of wavelengths enters; a wavelength dispersion element where a signal beam that has entered from the incidence part is spatially dispersed according to the wavelength thereof; a first condensing element that condenses the light dispersed by the wavelength dispersion element onto a two-dimensional plane; a wavelength selection element that uses a multilevel optical phased array arranged in a position to receive incident light developed on an xy-plane made of an x-axis direction and a y-axis direction perpendicular thereto developed according to a wavelength, having a multiplicity of pixels arrayed in a lattice on the xy-plane, and that cyclically changes the two dimensional phase shift characteristic of each pixel to a sawtooth wave pattern; a wavelength selection element drive part that drives an electrode for each pixel arrayed in an xy direction of the wavelength selection element, generates a composite wave of two or more sawtooth waves along the y-axis for all pixels on the y-axis that have an x-coordinate common with at least one pixel on the x-axis, changes a phase shift amount according to such composite wave, and transmits light of a wavelength applied to that pixel in a plurality of directions; a second condensing element that condenses the light of each wavelength transmitted by the wavelength selection element; and a wavelength combining element that respectively combines dispersed light condensed by the second condensing element for each incident position.

In one or more embodiments, the wavelength selection element drive part may be configured to control, by a first pattern, a pixel group of a first region made of a continuous plurality of x-axis coordinates of the wavelength selection element, and of pixels of all y-coordinates that include the x-axis coordinates thereof; control, by a second pattern, a pixel group of a second region made of a continuous other plurality of x-axis coordinates, and of pixels of all y-coordinates that include the x-axis coordinates thereof; and control, by a first combined pattern that combines the first and second patterns, a pixel group of a third region that includes all y-coordinates for one x-axis coordinate between the first and second regions.

In one or more embodiments, the wavelength selection element drive part may be configured to control, by a second combined pattern that combines a first pattern and a third pattern, a pixel group of a first region made of a continuous plurality of x-axis coordinates of the wavelength selection element, and of pixels of all y-coordinates that include the x-axis coordinates thereof; control, by a second pattern, a pixel group of a second region made of a continuous other plurality of x-axis coordinates, and of pixels of all y-coordinates that include the x-axis coordinates thereof; and control, by a third combined pattern that combines the second combined pattern and the second pattern, a pixel group of a third region that includes all y-coordinates for one x-axis coordinate between the first and second regions.

In one or more embodiments, the wavelength selection element drive part may be configured to, when a combined pattern of a first and second pattern is a fourth combined pattern, a pattern that combines a first and fourth pattern is a fifth combined pattern, and a pattern that combines a second and fourth pattern is a sixth combined pattern; control, by the fifth pattern, a pixel group of a first region made of a continuous plurality of x-axis coordinates of the wavelength selection element, and of pixels of all y-coordinates that include the x-axis coordinates thereof; control, by the sixth pattern, a pixel group of a second region made of a continuous other plurality of x-axis coordinates, and of pixels of all y-coordinates that include the x-axis coordinates thereof; and control, by the fourth combined pattern, a pixel group of a third region that includes all y-coordinates for at least one x-axis coordinate between the first and second regions.

In one or more embodiments, the wavelength selection element drive part may be configured to, when a combined pattern of a first and second pattern is a fourth combined pattern, a pattern that combines a first and fourth pattern is a fifth combined pattern, a pattern that combines a first and fourth pattern is a sixth combined pattern, a pattern that combines a fifth combined pattern and a fourth pattern is a seventh combined pattern, a pattern that combines a fourth combined pattern and a fourth pattern is an eighth combined pattern, and a pattern that combines a sixth combined pattern and a fourth pattern is a ninth combined pattern; control, by the seventh pattern, a pixel group of a first region made of a continuous plurality of x-axis coordinates of the wavelength selection element, and of pixels of all y-coordinates that include the x-axis coordinates thereof; control, by the ninth pattern, a pixel group of a second region made of a continuous other plurality of x-axis coordinates, and of pixels of all y-coordinates that include the x-axis coordinates thereof; and control, by the eighth combined pattern, a pixel group of a third region that includes all y-coordinates for at least one x-axis coordinate between the first and second regions.

In one or more embodiments, the wavelength selection element may be a LCOS element having a multiplicity of pixels arrayed two-dimensionally, and the wavelength selection element drive part controls the voltage applied to each pixel according to wavelength selection characteristics.

In one or more embodiments, the wavelength selection element may be a liquid crystal element having a multiplicity of pixels arrayed two-dimensionally, and the wavelength selection element drive part controls the voltage applied to each pixel according to wavelength selection characteristics.

In one or more embodiments, the wavelength selection element may be a MEMS element having a multiplicity of pixels arrayed two-dimensionally, and the wavelength selection element drive part controls the voltage applied to each pixel according to wavelength selection characteristics.

According to one or more embodiments of the present invention, a light beam can be reflected or transmitted in a plurality of directions by using a multilevel optical phased array in an optical switch device to perform wavelength selection and controlling by providing a combined pattern on a region made of pixels of all y-coordinates that include at least one x-coordinate. In addition, wavelength selection is possible at high precision of one pixel unit or less of a wavelength selection element. In addition, an effect is obtained in that narrowing of the wavelength beyond the designed band is alleviated without generating a fringe effect. One or more embodiments also enable light of a selected wavelength to be attenuated at a high resolution. Furthermore, in one or more embodiments, an effect is obtained in that output of each region can be output as an average.

BRIEF DESCRIPTION OF THE DRAWINGS

FIG. 8B is a diagram illustrating an optical arrangement from the y-axis direction of a transmissive type wavelength selective optical switch device according to the second embodiment of the present invention.

DETAILED DESCRIPTION OF THE INVENTION

First Embodiment

Figure 7A:
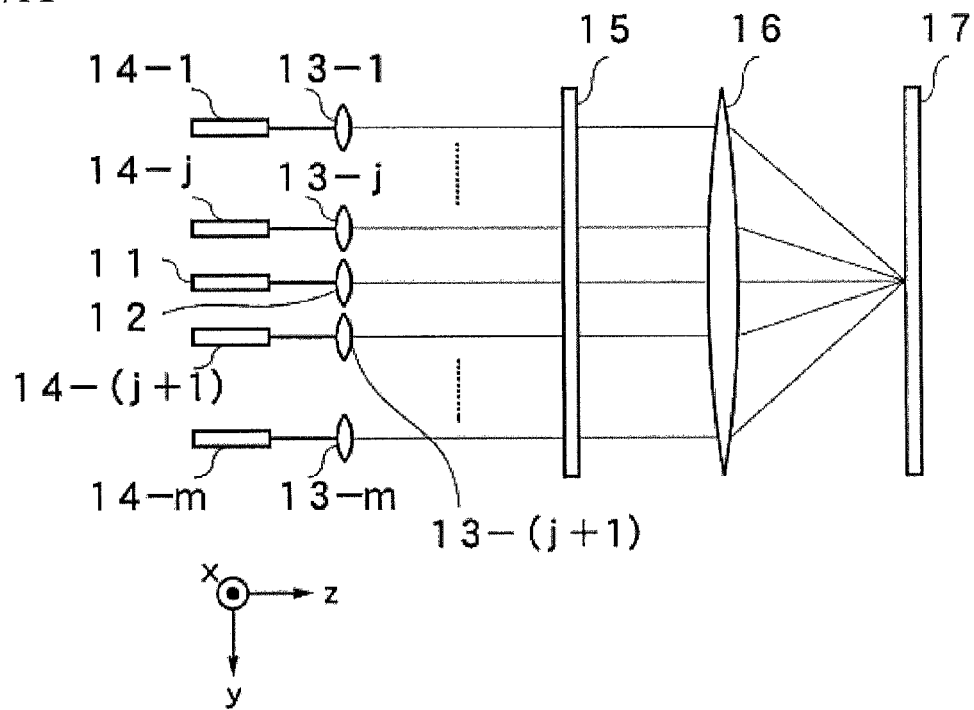
FIG. 7A is a diagram illustrating an optical arrangement as viewed from the x-axis direction of a reflective type wavelength selective optical switch device according to a first embodiment of the present invention.
Figure 7B:
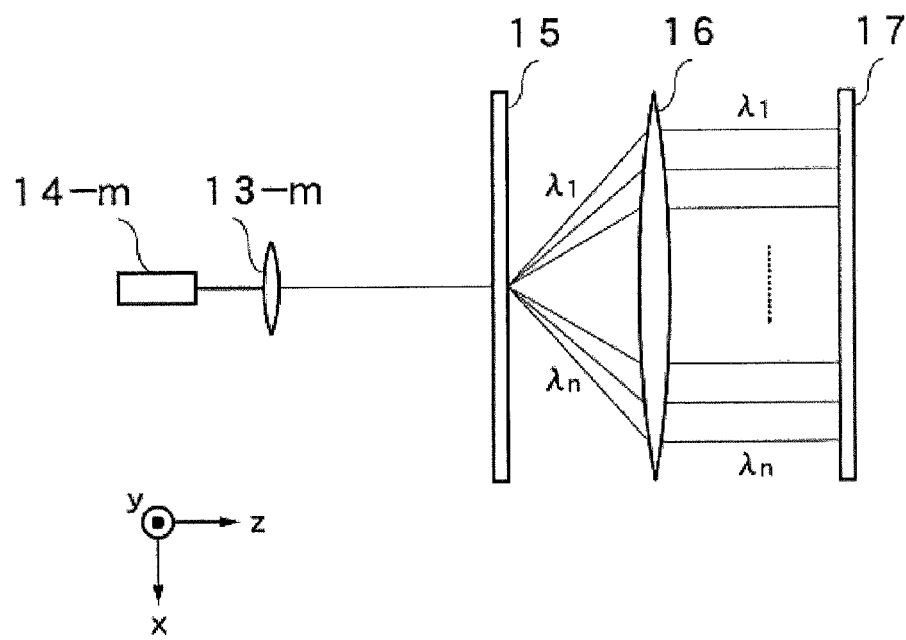
FIG. 7B is a diagram illustrating an optical arrangement from the y-axis direction of a reflective type wavelength selective optical switch device according to the first embodiment of the present invention.

FIG. 7A is a side view as viewed from the x-axis direction illustrating a configuration of an optical element of a reflective type wavelength selective optical switch device according to a first embodiment of the present invention, and FIG. 7B is a side view as viewed from the y-axis thereof. The incident light is a WDM signal beam in which optical signals of wavelengths between $\lambda_1$ to $\lambda_n$ have been multiplexed. The WDM light exits to a collimate lens 12 via respective optical fiber 11. Although the collimate lens 12 outputs beams having fixed widths in the x direction and y direction in parallel, only the center line thereof is illustrated in FIG. 7A. Further, beams that entered into collimate lenses 13-1 to 13-$m$ exit to the outside from optical fiber 14-1 to 14-$m$ arranged in parallel to the respective optical fiber 11. Here, m is a natural number not less than 1. The WDM light that exits from the collimate lens 12 is parallel to the z axis, and the WDM light enters into a wavelength dispersion element 15. The wavelength dispersion element 15 disperses light into different directions on an xz plane according to wavelength. Here, the wavelength dispersion element 15 may be a diffraction grating or it may be a prism and the like. Furthermore, it may also have a combined configuration of a diffraction grating and a prism. The light dispersed by the wavelength dispersion element 15 in this manner is provided on the lens 16. The lens 16 is a condensing element that condenses the light that has been dispersed on the xz plane in parallel to the z axis direction, and the condensed light enters a wavelength selection element 17.

Note that although the description given here in FIG. 7B is an example illustrating light of a longest wavelength $\lambda_1$ to a shortest wavelength $\lambda_n$, because the incident light is a WDM signal beam having a multiplicity of specters between $\lambda_1$ to $\lambda_n$, the WDM signal beam developed along the xz plane is added to the wavelength selection element 17 in the form of a band. The wavelength selection element 17 reflects the incident light in different directions according to the wavelength, and the selection characteristics for an optical filter are determined according to the reflective characteristics thereof and a detailed description will be given hereinafter. The light that has been reflected by the wavelength selection element 17 is added to the lens 16 through an identical path and is added again to the wavelength dispersion element 15. The wavelength dispersion element 15 condenses the reflected light in the same direction as the original incident light, converts it to a beam parallel to the z axis, and exits to the optical fiber 14-1 to 14-$m$ respectively via the collimate lenses 13-1 to 13-$m$. Here, the optical fiber 11 and 14-1 to 14-$m$ and the collimate lenses 12 and 13-1 to 13-$m$ are configured of an incident and exit part where the WDM signal beam enters and selected light exits.

Second Embodiment

Figure 8A:
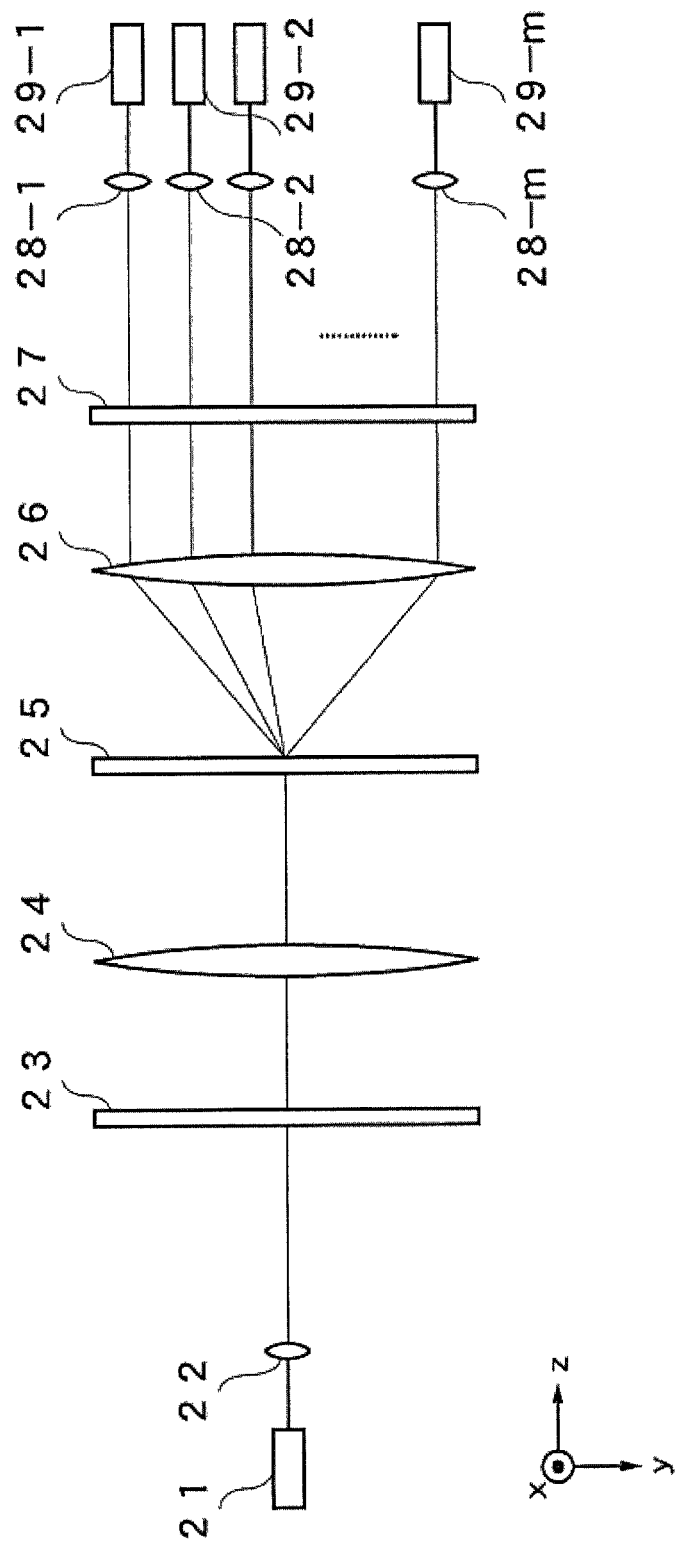
FIG. 8A is a diagram illustrating an optical arrangement as viewed from the x-axis direction of a transmissive type wavelength selective optical switch device according to a second embodiment of the present invention.

Next, a description will be given of a transmissive type wavelength selective optical switch device according to a second embodiment of the present invention. FIG. 8A is a side view as viewed from the x-axis direction illustrating a configuration of an optical element of a transmissive type of wavelength selective optical switch device according to a second embodiment of the present invention, and FIG. 8B is a side view as viewed from the y-axis thereof. The incident light in FIG. 8A is also a WDM signal as described in the first embodiment, and it enters the collimate lens 22 from the optical fiber 21 and is provided to the first wavelength dispersion element 23 as a parallel optical beam. The optical fiber 21 and the collimate lens 22 are provided with incident parts where the WDM signal beam enters. The wavelength dispersion element 23 exits light beams in different directions on an xz plane according to the wavelengths of the beams as illustrated in FIG. 8B. The wavelength dispersion element 23, similarly to the wavelength dispersion element 15, may be implemented by a diffraction grating or a prism, or by a combination of a diffraction grating and a prism. All dispersed light enters into lens 24. The lens 24 is a first condensing element that condenses the light that has been dispersed on the xz plane in parallel to the z axis direction. Furthermore, a wavelength selection element 25 is arranged perpendicular to the optical axis of lens 24. The wavelength selection element 25 transmits incident light in a desired direction according to wavelength, and a detailed description will be given hereinafter. The light transmitted by the wavelength selection element 25 enters the lens 26. The lens 24 and wavelength selection element 23, and the lens 26 and the wavelength synthesizing element 27 have plane symmetry to the xy-plane of the center of the wavelength selection element 25. The lens 26 is a second condensing element that condenses parallel beams on the xz plane, and the wavelength synthesizing element 27 combines and exits incident light in identical positions from different directions as illustrated in FIG. 8B. The light that was synthesized by the wavelength synthesizing element 27 is provided to the optical fiber 29-1 to 29-$m$ via the collimate lenses 28-1 to 28-$m$. The collimate lenses 28-1 to 28-$m$ and optical fiber 29-1 to 29-$m$ are provided with exit parts where light of selected wavelengths exit.

(Configuration of Wavelength Selection Element)

Figure 9:
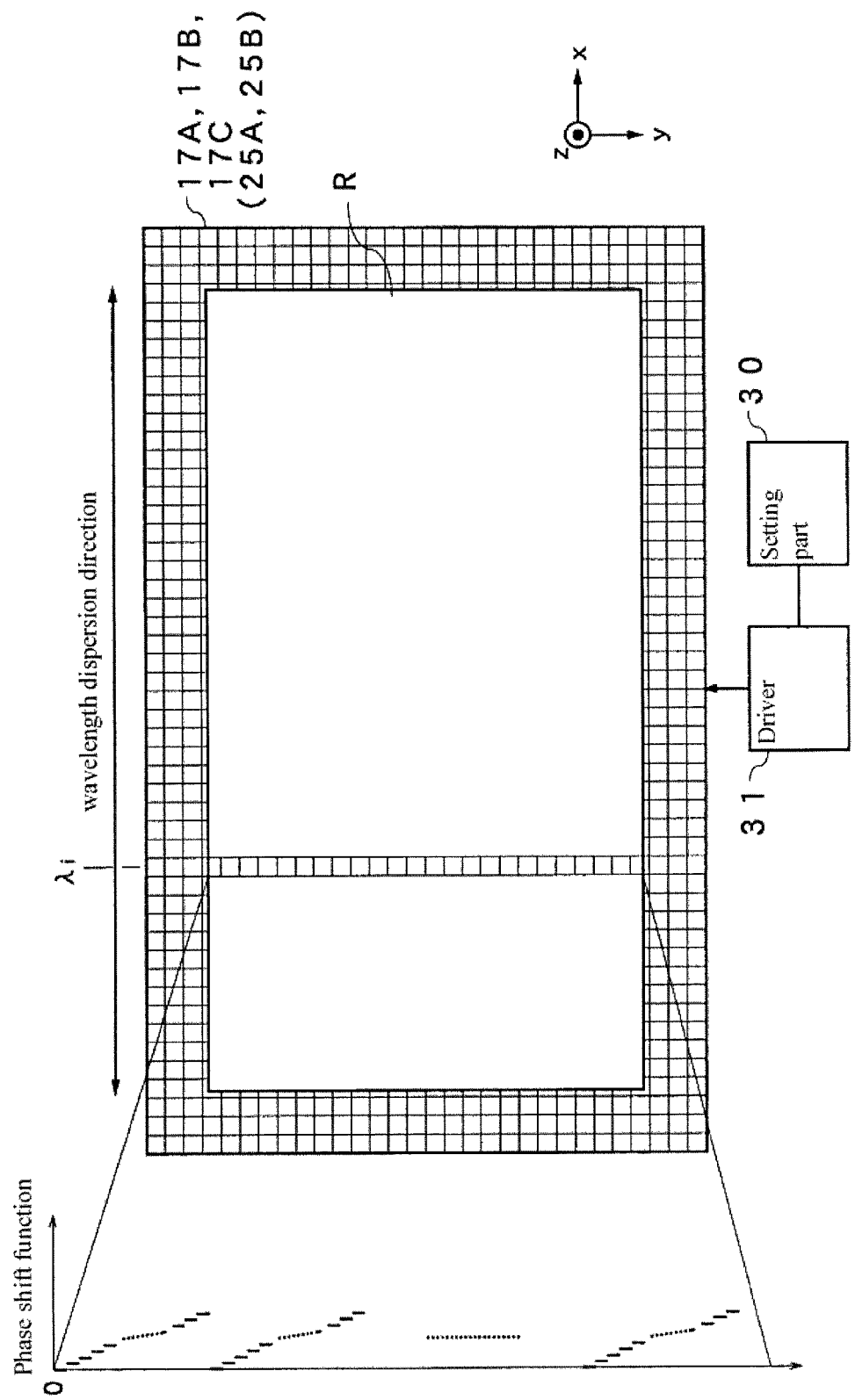
FIG. 9 is a diagram illustrating a two-dimensional wavelength selection element used in the wavelength selective optical switch device according to the first and second embodiments of the present invention.

Next, a description will be given here of wavelength selection elements 17 and 25 used in a wavelength selective optical switch device according to the first and second embodiments. In the first and second embodiments, incident light is dispersed on the xz plane according to the wavelength, and when it enters the wavelength selection elements 17 and 25 as a band of light, the incident region thereof is the region R having a rectangular shape indicated in FIG. 9. Further, in the wavelength selective optical switch device of the first embodiment, selecting the direction to be reflected according to wavelength enables a beam having any wavelength to be selected. Further, in the wavelength selective optical switch device of the second embodiment, selecting the direction to be transmitted according to wavelength enables a beam having any wavelength to be selected. A setting part 30 is connected to the wavelength selection elements 17 and 25 via a driver 31. The setting part 30 sets by matching the pixels that reflect or transmit the light of the xy-plane to the selected wavelength as will be described below. The driver 31 includes a D/A converter that converts an input digital to voltage to be applied to the pixels. The setting part 30 and the driver 31 configure the wavelength selection element drive part that controls the characteristics of the pixels at a specified position of the x-axis and y-axis directions by driving the electrodes of each pixel arrayed in the xy direction of the wavelength selection element.

Figure 10A:
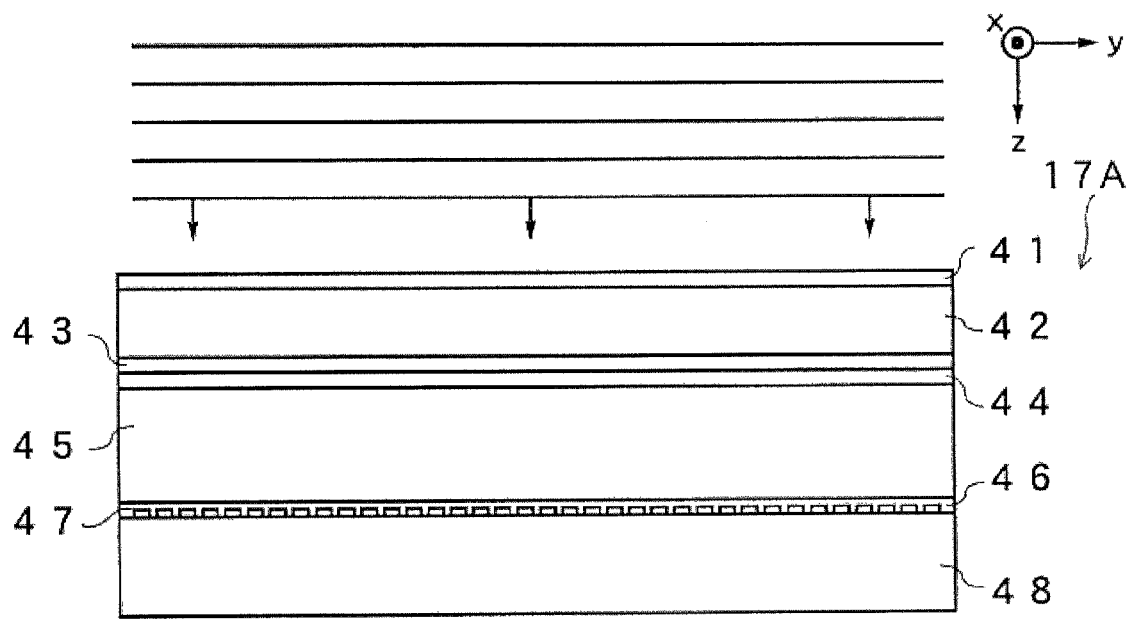
FIG. 10A is a diagram illustrating a structure of a wavelength selection element and the incidence of light into the wavelength selection element of the wavelength selective optical switch device according to the first embodiment of the present invention.

Next, a description will be given of a specific configuration of the wavelength selection element 17. The wavelength selection element 17 can be implemented by using a liquid crystal on silicon (LCOS) liquid crystal element. Because the LCOS element 17A has a built-in liquid crystal driver on the back plane of each pixel, the pixel count can be increased and can be configured from a multiplicity of lattice shaped pixels of, for example, 1920×1080. FIG. 10A is an outline diagram illustrating the LCOS element 17A and is configured by layering along the z axis from the surface where light enters an AR layer 41, glass layer 42, transparent common electrode layer 43, alignment layer 44, liquid crystal 45, alignment layer 46 that includes a multiplicity of backplane reflective electrodes 47, and a silicone layer 48.

Figure 10B:
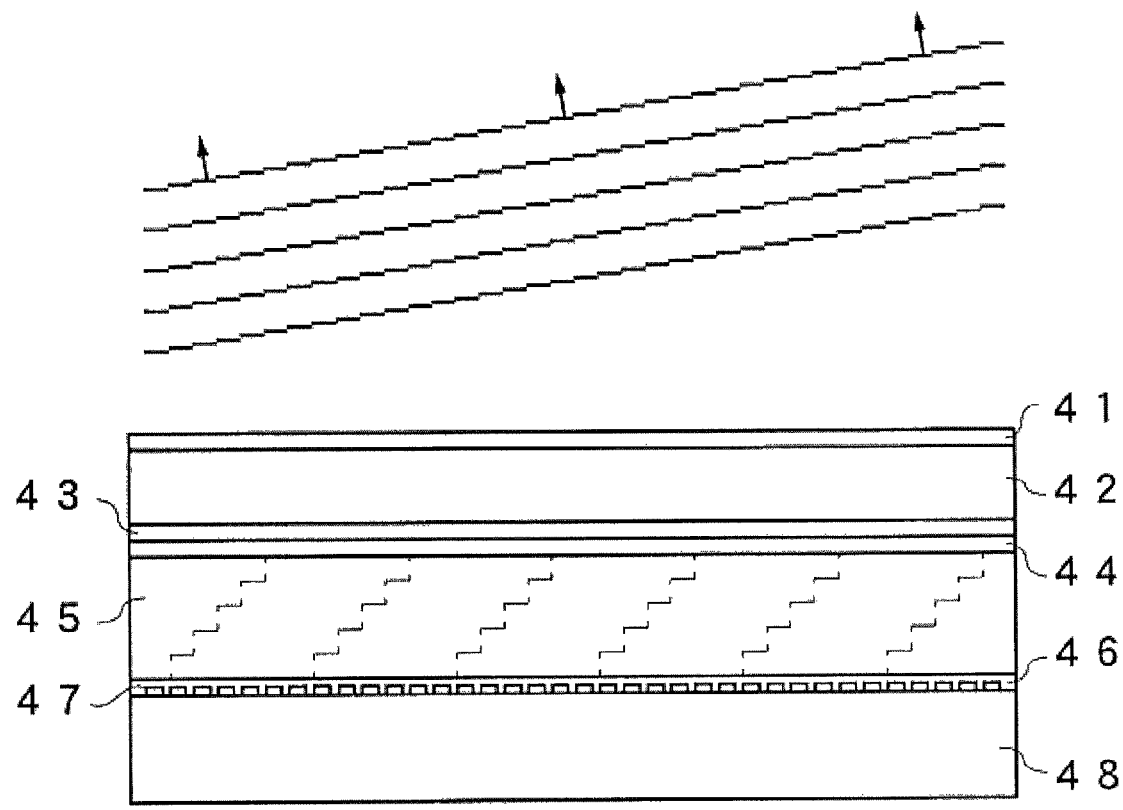
FIG. 10B is a diagram illustrating the reflection of light from the wavelength selection element in accordance with one or more embodiments of the present invention.
Figure 11:
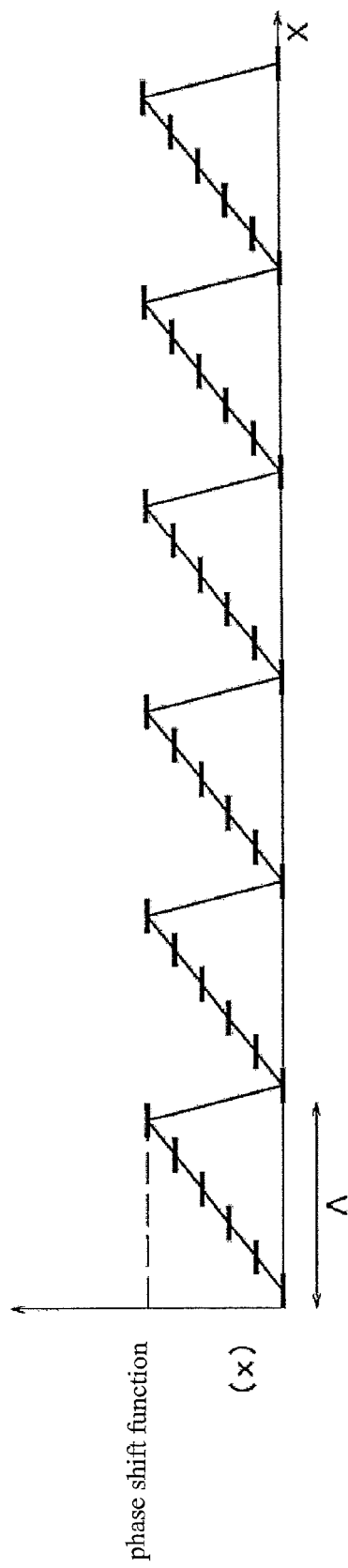
FIG. 11 is a diagram illustrating the relationship between the incident position of an LCOS element and the phase shift in accordance with one or more embodiments of the present invention.

With the LCOS element 17A, light beams enter at different position according to wavelength. In other words, the light added to the incident region R is light in which the WDM beam is developed on the xy-plane according to a wavelength band $\lambda_i$ (i=1 to n). Here, when the wavelength dispersion direction is the x-axis direction indicated in FIG. 9, a multiplicity of pixels lined up in the y-axis direction correspond to respective wavelengths. Therefore, providing different cyclical voltages to a multiplicity of y-axis direction pixels where a beam of wavelength $\lambda_i$ of the LCOS element 17A enters, allows the refractive index to change to an overall sawtooth shape expressed by a stepped phase shift function such as that illustrated in FIG. 9. FIG. 11 is a drawing illustrating the relationship between this phase shift function and the beam incident position. In FIG. 11, the phase shift amount is changed in steps by a plurality of pixels, herein six pixels, and the change is repeated in cycles so as to implement a function equivalent to a braided type diffraction grating. Note that in the drawing, the linear sawtooth wave indicates a case of a braided type diffraction grating, and the stepped shape waveform indicates a case of an LCOS element having a multiplicity of levels. By changing the refractive index in this manner, a multilevel beam phased array can be implemented, and differing reflective directions such as that illustrated in FIG. 10B are possible by the diffraction phenomenon. Here, appropriately selecting the phase shift function enables the refraction angle of incident light to be changed in different directions according to each wavelength respectively, and thus, the LCOS element can be considered a variable characteristic type diffraction grating. Therefore, the diffraction angle of each wavelength component can be independently controlled by applying voltage between the transparent common electrode 43 and the backplane reflective electrode 47 while being able to reflect input light of a specific wavelength in a desired direction, diffract light of other wavelength components as unnecessary light, and reflect light in a direction that does not exit.

In addition, a description will be given of a liquid crystal element 17B having a reflective type two-dimensional electrode array that does not have a LCOS structure as a second example of the wavelength selection element 17. Although a liquid crystal driver is built-in to the backplane of the pixels for a LCOS element, a two-dimensional electrode array liquid crustal element 17B is provided with a liquid crystal modulating driver external to the element. Such other configuration is similar to the LCOS element thereby enabling the multilevel optical phased array described above to be implemented.

A description will be given of a two-dimensional MEMS element 17C as a third example of a wavelength selection element 17. A MEMS element having a multiplicity of MEMS mirrors arranged two dimensionally is implemented as a digital micro device (DMD). All pixels of one column of the y-axis direction of the MEMS mirrors are configured to accommodate certain wavelengths of WDM signals. When a MEMS is used, because the pixels for a plurality of MEMS devices are made to support a single wavelength band, voltage applied to a multiplicity of pixels can be controlled to support a single wavelength. In addition, the position on the z axis for each pixel of the MEMS device can be configured as a whole so as to have a fixed cycle sawtooth shaped waveform as illustrated by the phased shift function thereby enabling reflection in different directions according to the wavelength of the incident beam.

Next, a description will be given of a transmissive type wavelength selection element 25 used in a wavelength selective optical switch device of the second embodiment. As a first example of this wavelength selection element 25, a configuration can be provided that uses a transmissive type two-dimensional LCOS element 25A. The transmissive type LCOS element 25A is a transparent electrode that replaces the backplane reflective electrode 47 of FIGS. 10A and 10B. Also in this case, because light beams enter in different positions according to each wavelength, the optical signal can be selected if transmitted through the pixel in that position. Because the LCOS element 25A supports a plurality of pixels in the y-axis direction in positions that correspond to one wavelength, applying a voltage between transparent electrodes for these plurality of pixels forms concavity and convexity in the refractive index that can generate a diffraction phenomenon. In addition, the diffraction angle of each wavelength can be independently controlled to enable input light of a specific wavelength to be diffracted in a specific direction as illustrated in FIG. 8A, or light can be diffracted in a direction where light having other wavelength components can be exited as unnecessary light.

In addition, a liquid crystal element 25B having a transmissive type two-dimensional electrode array that does not have a LCOS structure may be used as a second example of the wavelength selection element 25. Although a liquid crystal driver is built-in to the backplane of the pixels for a LCOS element, a two-dimensional electrode array liquid crustal element 25B is provided with a liquid crystal modulating driver external to the element. Such other configuration is similar to the LCOS element.

Next, the diffraction angle of the multilevel beam phased array is expressed by equation (1).

$$\sin \theta_{in} + \sin \theta_{dif} = m \cdot \lambda / \Lambda \tag{1}$$

Figure 12A:
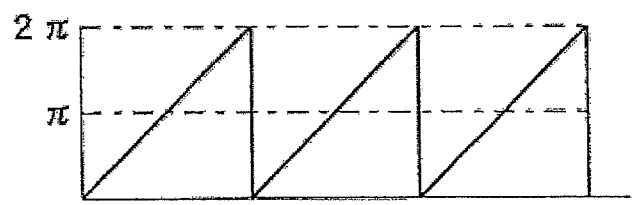
FIGS. 12(a) and (b) are diagrams illustrating a reflective angle of light and a phase pattern for when a certain phase pattern is applied to a LCOS element in accordance with one or more embodiments of the present invention.

Here,
q: number of multi levels
m: diffraction order
$\lambda$: wavelength
$\Lambda$: phased array pitch
$\theta_{in}$: incident angle
$\theta_{dif}$: diffraction angle Next, a method for characteristic control of a wavelength selection element will be given using a LCOS element 17A as one example. First, a phase pattern applied to the LCOS element 17A has a sawtooth wave pattern of a fixed cycle in which the maximum phase shift amount is $2\pi$ as illustrated in FIG. 12(a). In this case, the reflected light becomes a beam having angle $\theta_1$ as illustrated in FIG. 12(b).

Figure 13A:
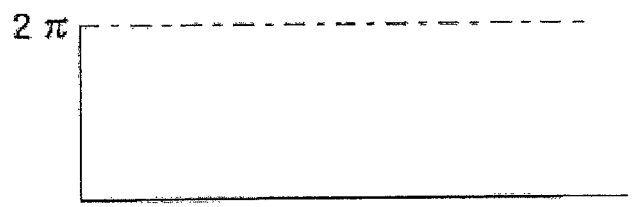
FIGS. 13(a) and (b) are diagrams illustrating a reflective angle of a LCOS element when voltage is not applied to a pixel in accordance with one or more embodiments of the present invention.

Next, as illustrated in FIG. 13(a), when voltage is not applied to the pixels, the LCOS element 17A is in a mirror state and gives a mirror reflection. The reflective angle at this time is $\theta_0$. At this time, reflected light at identical level to FIG. 12(a) is obtained.

Figure 12B:
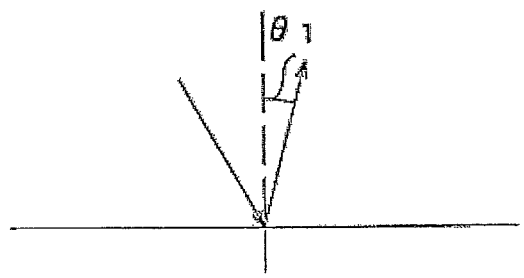
Figure 13B:
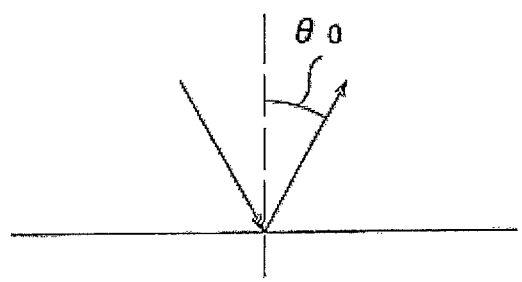
Figure 14A:
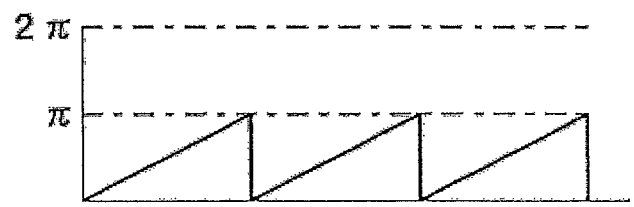
FIGS. 14(a) and (b) are diagrams illustrating reflected light on incident light when a phase pattern having a maximum phase shift amount on a pixel of it is applied to a LCOS element.
Figure 14B:
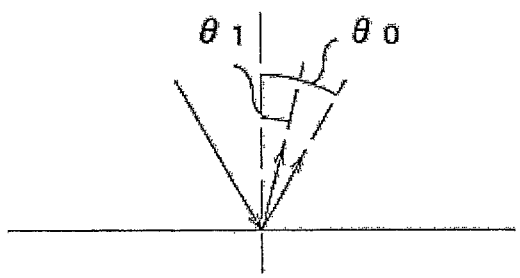

As further illustrated in FIG. 14(a), when applying output of a sawtooth wave pattern that changes by an identical cycle as that given in FIG. 12(a) by making the maximum phase shift amount to be $\pi$, the output as illustrated in FIG. 14(b) is dispersed into reflected light of angles $\theta_1$ and $\theta_0$ with the respective levels becoming ½ that of FIG. 12(b) and FIG. 13(b). In addition, continuously lowering the maximum phase shift amount from $2\pi$ also creates a continual change in spectral relativity to states from that in FIG. 12(b), passing through that of FIG. 14(b), to that of FIG. 13(b).

Figure 15A:
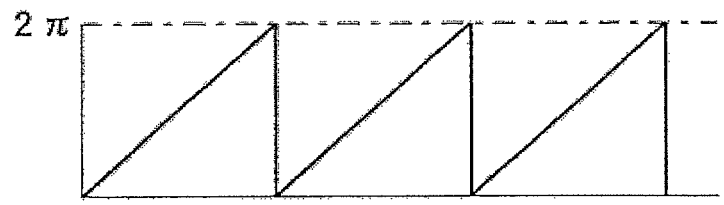
FIGS. 15(a) and (b) are diagrams illustrating a reflective angle of light and a phase pattern for when a certain phase pattern A is given to a LCOS element in accordance with one or more embodiments of the present invention.
Figure 15B:
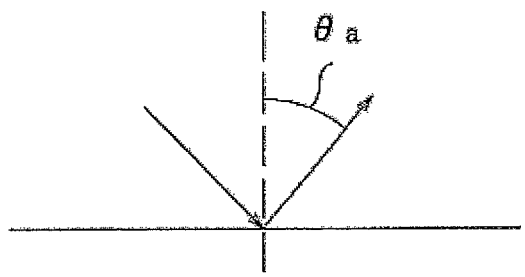
Figure 16A:
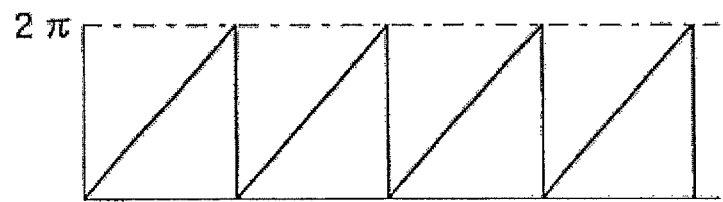
FIGS. 16(a) and (b) are diagrams illustrating a reflective angle of light and a phase pattern for when a certain phase pattern B is applied to a LCOS element in accordance with one or more embodiments of the present invention.
Figure 16B:
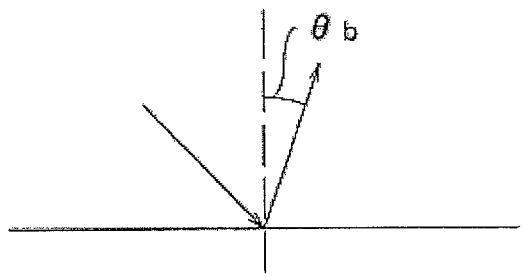
Figure 17A:
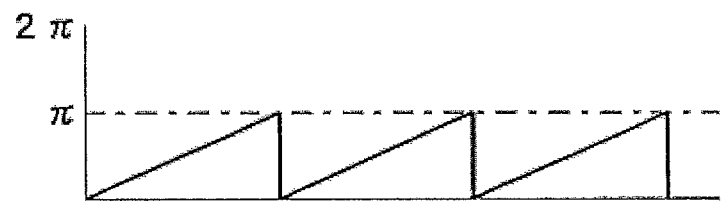
FIGS. 17(a)-(d) are diagrams illustrating the reflective angle and reflective intensity on incident light when a phase pattern that combines phase patterns A and B is applied in accordance with one or more embodiments of the present invention.
Figure 17B:
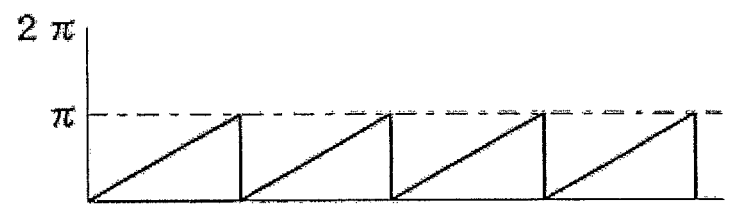
Figure 17C:
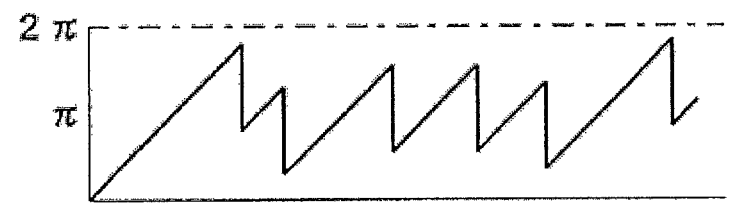
Figure 17D:
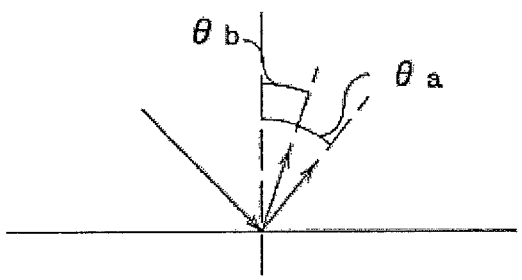

Next, as illustrated in FIG. 15(a), when the maximum phase shift amount is made to be $2\pi$ by a first phase pattern A having a sawtooth wave pattern of a cycle of certain pixel units, the reflection angle at such time becomes the angle $\theta_a$ as illustrated in FIG. 15(b). As illustrated in FIG. 16(a), when the maximum phase shift amount is made to be $2\pi$ by a second phase pattern B having a sawtooth wave pattern of a cycle of different pixel units, the reflection angle at such time becomes the angle $\theta_b$. In addition, when the maximum phase shift amounts of patterns A and B are made to be ½ of the original, which is to say they are made to be $\pi$ as illustrated in FIG. 17(a) and (b), and these are combined to generate a combined pattern A+B as illustrated in FIG. 17(c) and applied to each pixel of the LCOS element, reflected light having ½ levels respectively can be obtained in two directions at angles $\theta_a$ and $\theta_b$ as illustrated in FIG. 17(d). Moreover, continuously changing the ratio for combining the output level of pattern A with pattern B also creates a change in the levels of reflected light of angles $\theta_a$ and $\theta_b$ accordingly. Further, light can be reflected in three or more mutually different directions by using other patterns and combining in a similar manner so that the total of the maximum phase shift amount becomes $2\pi$. With the present invention, a wavelength selection element can be controlled more precisely based on this discovery. Note that the above gives an explanation of a reflective type LCOS element 17A, however, other types of wavelength selection elements are also similar. In addition, the transmissive type LCOS element 25A according to the second embodiment and such other wavelength selection elements may be configured in a similar manner.

(High Resolution Wavelength Setting)

Figure 18A:
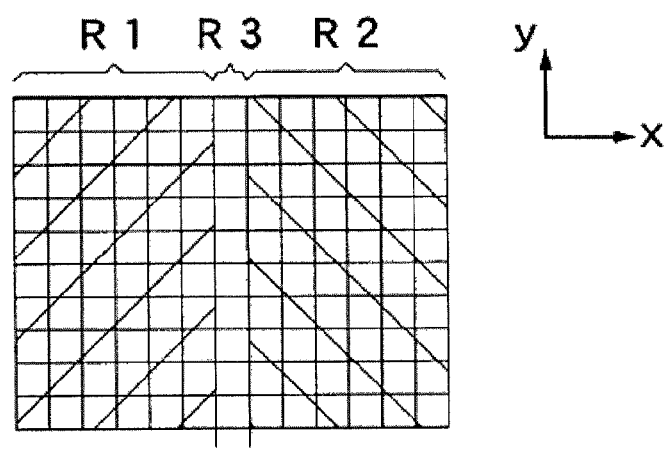
FIGS. 18(a)-(c) are diagrams illustrating a state for wavelength control at a high resolution by applying a combined pattern in accordance with one or more embodiments of the present invention.

Next, a detailed description will be given of wavelength control at a high resolution for a pixel unit or less of the wavelength selective optical switch device according to the first and second embodiments of the present invention. In the following explanation, a description will be given for when a LCOS element 17A is used in the wavelength selection element 17 in the wavelength selective optical switch device of the first embodiment. FIG. 18 illustrates a first region R1 according to a wavelength selection element drive part that applies a first pattern A having a sawtooth wave pattern along the y-axis direction in the LCOS element 17A to make a reflective angle $\theta_a$, and where a second pattern B having a different cycle so as to reflect in a direction of reflective angle $\theta_b$ is applied to a second region R2. The first and second regions R1 and R2 are regions that have a continuous plurality of pixels in the x-axis direction and all pixels in the y direction. In addition, a third region R3 there between is a narrow region of a single pixel amount in the x-axis direction and all pixels in the y-axis direction. In region R3, voltage is applied so as to make a first combined pattern in which the phase shift amounts of pattern A and pattern B are combined. When making the combination ratio k to be arbitrary number between 0 and 1 in this combined pattern, the patterns A and B can be changed by the combination ratio k as shown below.

$$kA+(1-k)B$$

Figure 18B:
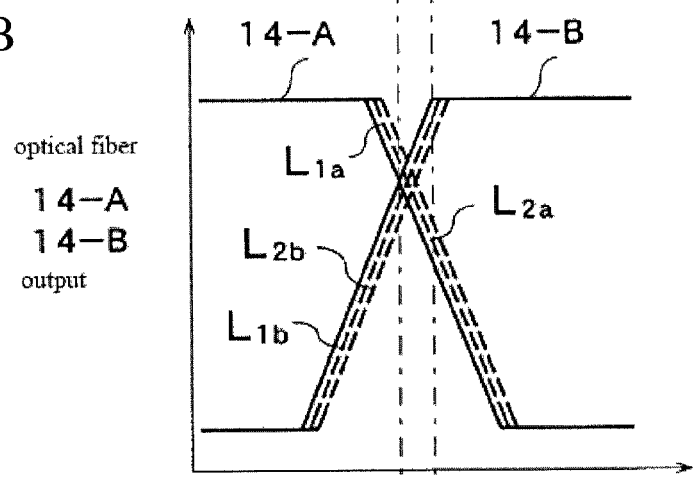
Figure 18C:
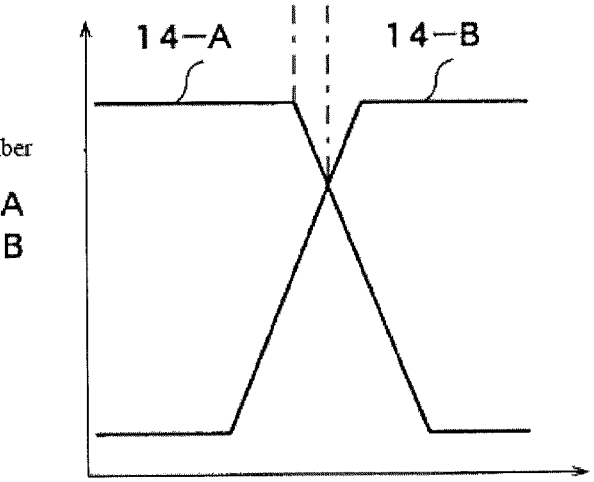

When making the combination ratio k to be 0, the characteristic curved line for fiber 14-A that receives the reflected light from the pixels to which pattern A is applied becomes that illustrated by the solid line in FIG. 18(b), and the characteristic curved line for fiber 14-B that receives the reflected light from the pixels to which pattern B is applied becomes that illustrated by the solid line in FIG. 18(b). When continuously raising the combination ratio k from 0, the two characteristic curved lines gradually shift to the right as illustrated by the broken line to be the characteristic curved lines $L_{1a}$, $L_{2a}$ and so forth for optical fiber 14-A and to be the characteristic curved lines $L_{1b}$, $L_{2b}$ and so forth for optical fiber 14-B. Making the combination coefficient k to be 1, the state of the characteristic curved line can be changed to be that illustrated in FIG. 18(c). By doing this, reflected light can be received such that the wavelength band that receives light gradually widens for optical fiber 14-A, and the wavelength band that receives light gradually narrows for optical fiber 14-B. By continuously changing the value of the combination ratio k, the characteristic curved lines also continuously change thereby enabling control of wavelengths to be performed at high resolution for one pixel or less without the passband narrowing.

(Attenuation Control)

Next, consideration will be given for when wanting to make suitable changes as described above in only the wavelength band by suitably attenuating only output levels of reflected light from region R1 without changing output of reflected light from region R2. This case also has optical fiber in which reflected light that corresponds to the first pattern A can be received as 14-A, and optical fiber in which reflected light that corresponds to the second pattern B can be received as 14-B. Therefore, the third pattern C is used in which the maximum phase shift amount is $2\pi$ with a sawtooth wave pattern of a cycle different than the phase characteristics of patterns A and B. When using pattern C, light is reflected in directions that optical fibers 14-A and 14-B do not receive. This reflected light may be received by other optical fiber or may be received by no optical fiber. Furthermore, a second combined pattern in which the phase characteristics of the first pattern A and to the third pattern C are combined in region R1 is applied as given below.

$$(1-k)A+kC$$

Here, k is the combination ratio.

Pattern B is applied to region R2. Also, when another combination coefficient is p for the region R3 in the boundary area thereof, a third combined pattern is applied in which the second combined pattern is combined with the second pattern B as in the following equation.

$$p\{(1-k)A+kC\}+(1-p)B$$

Figure 1A:
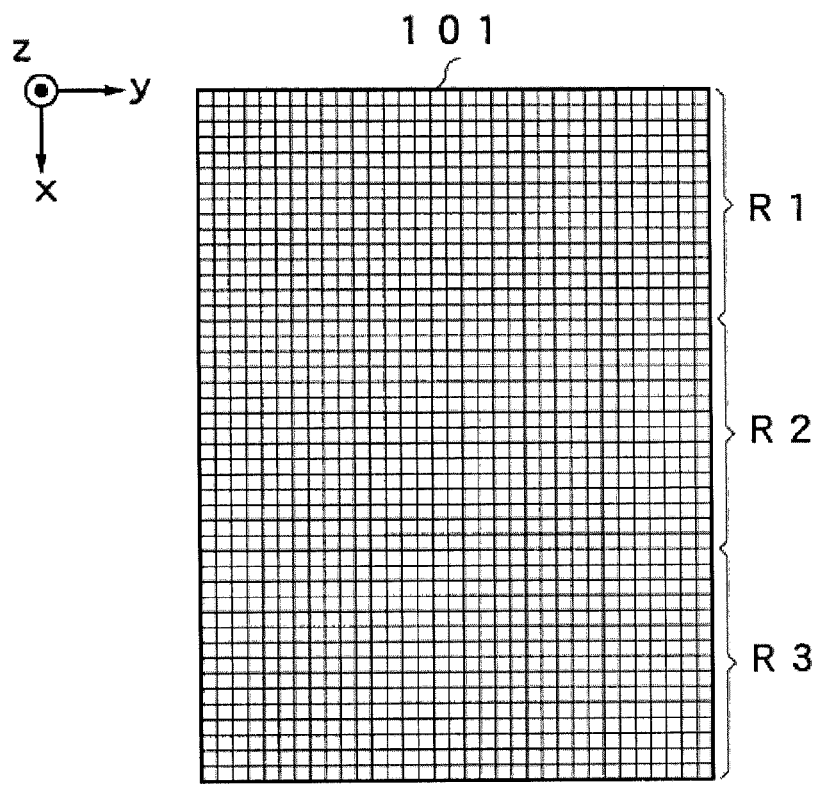
FIGS. 1(a)-(d) are diagrams illustrating a change of a phase shift amount applied to a LCOS element and three regions thereof in accordance with one or more embodiments of the present invention.
Figure 1B:
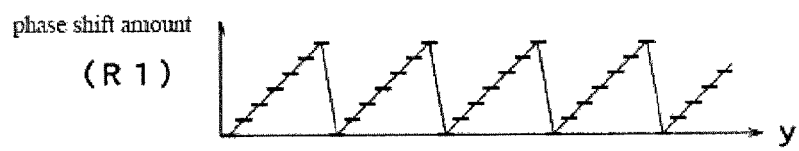
Figure 1C:
Figure 1D:
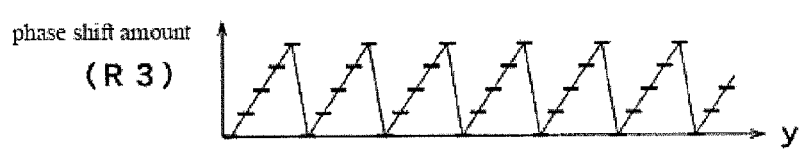
Figure 2:
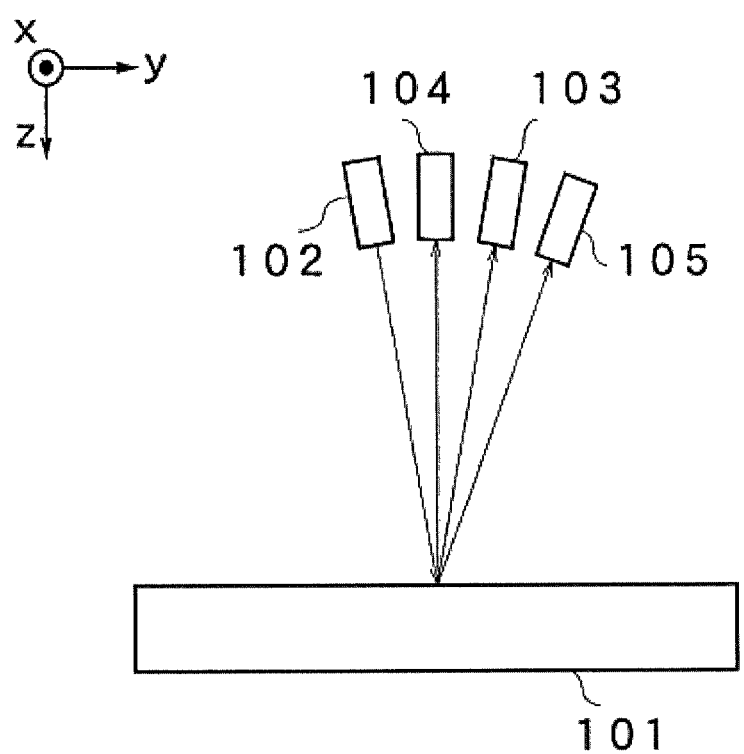
FIG. 2 is a diagram illustrating a LCOS element, an optical fiber where light is incident to this, and an optical fiber where reflected light is received in accordance with one or more embodiments of the present invention.
Figure 3A:
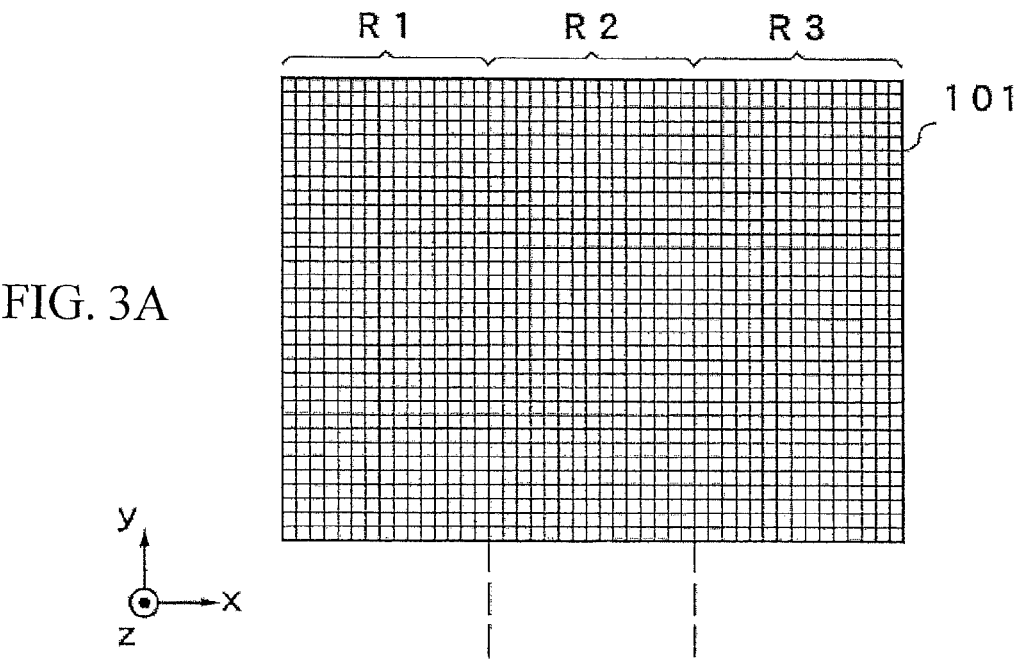
FIGS. 3(a)-(c) are diagrams illustrating a wavelength band that is incident to a LCOS element and an optical fiber in accordance with one or more embodiments of the present invention.
Figure 3B:
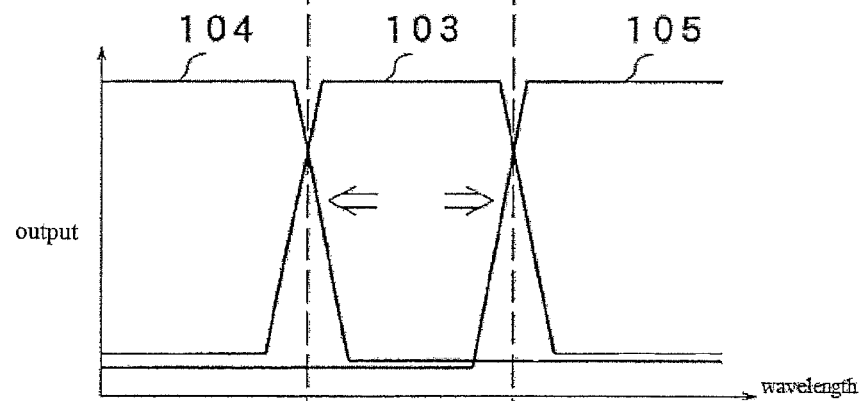
Figure 3C:
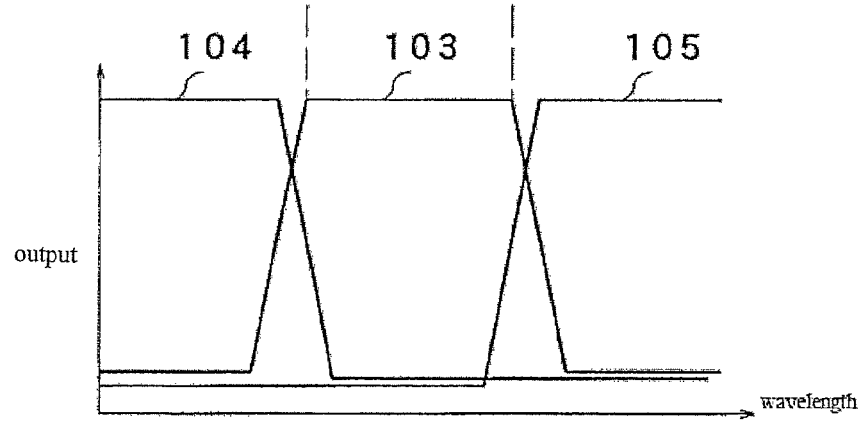
Figure 4:
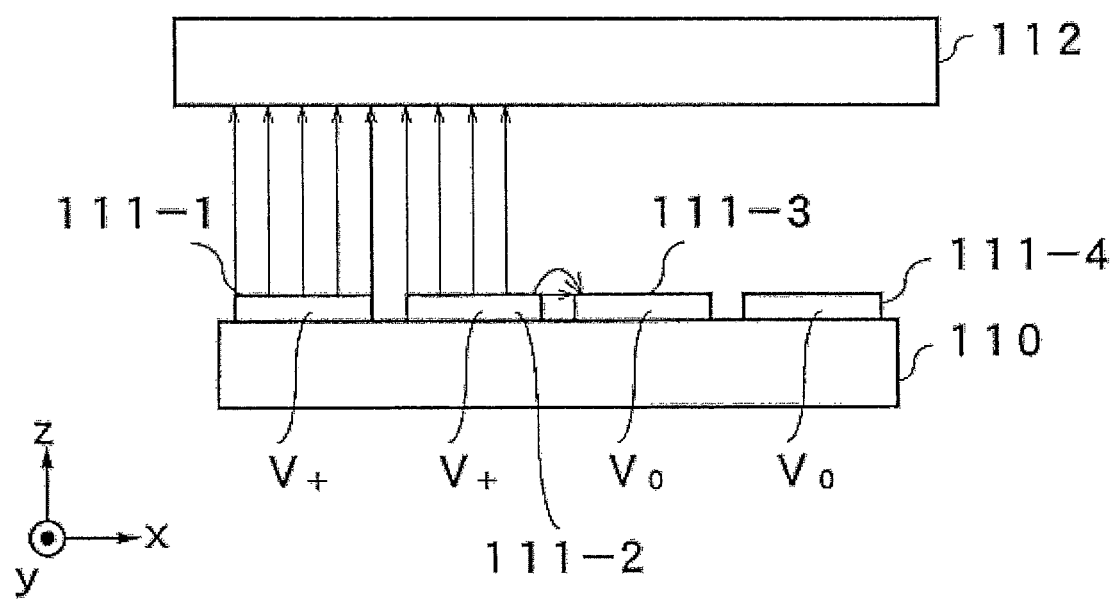
FIG. 4 is a diagram illustrating a pixel of a reflective electrode and a line of electric force in the boundary of a region in accordance with one or more embodiments of the present invention.
Figure 5A:
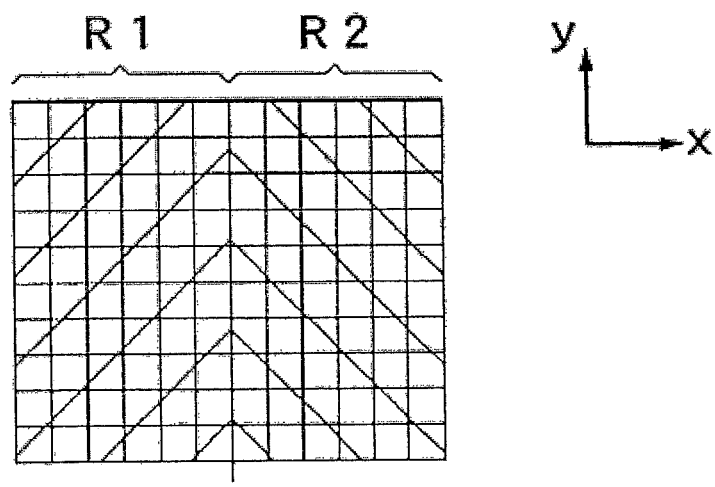
FIGS. 5(a) and (b) are diagrams illustrating neighboring regions and a wavelength band of reflected light in accordance with one or more embodiments of the present invention.
Figure 5B:
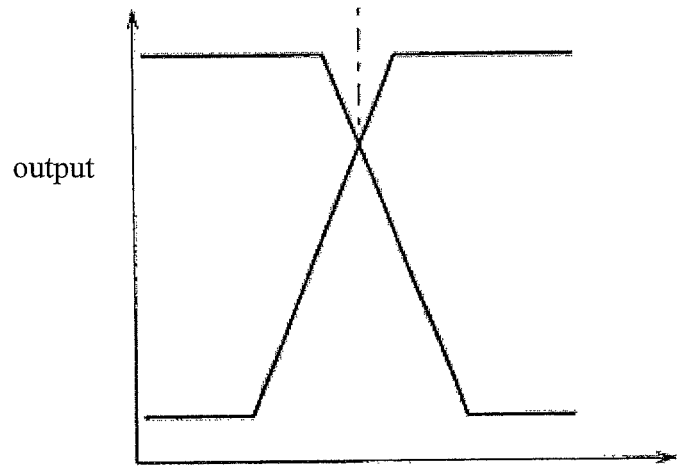
Figure 6A:
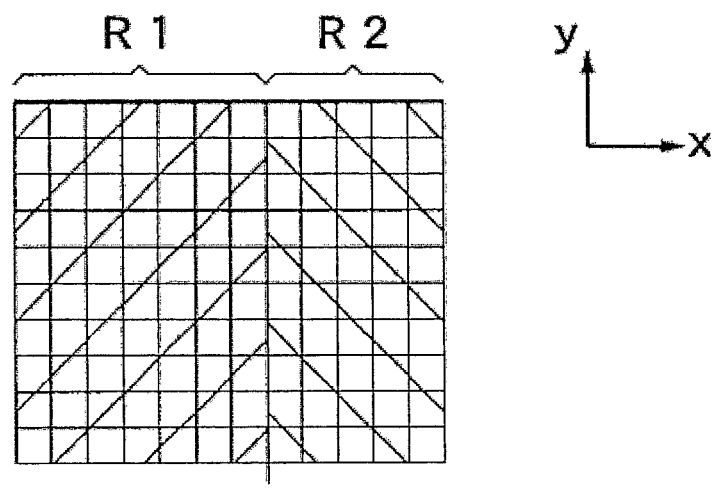
FIGS. 6(a) and (b) are diagrams illustrating neighboring regions and a wavelength band of reflected light in accordance with one or more embodiments of the present invention.
Figure 6B:
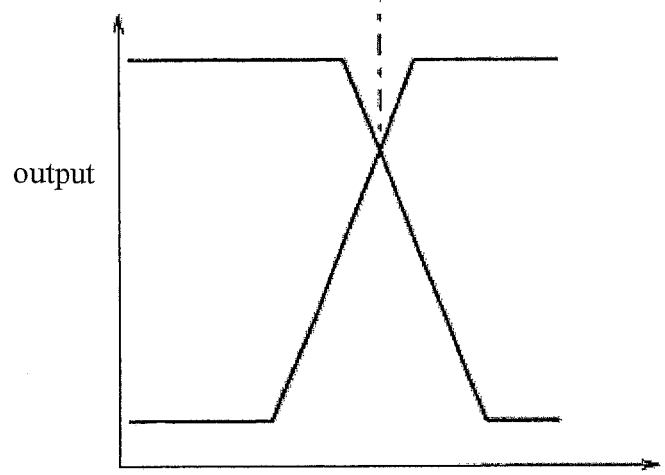
Figure 19A:
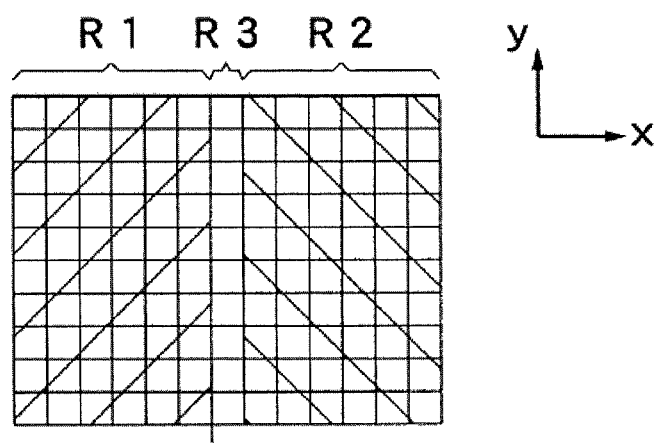
FIGS. 19 (a)-(c) are diagrams illustrating a state where an output level is attenuated by applying a combined pattern in accordance with one or more embodiments of the present invention.
Figure 19B:
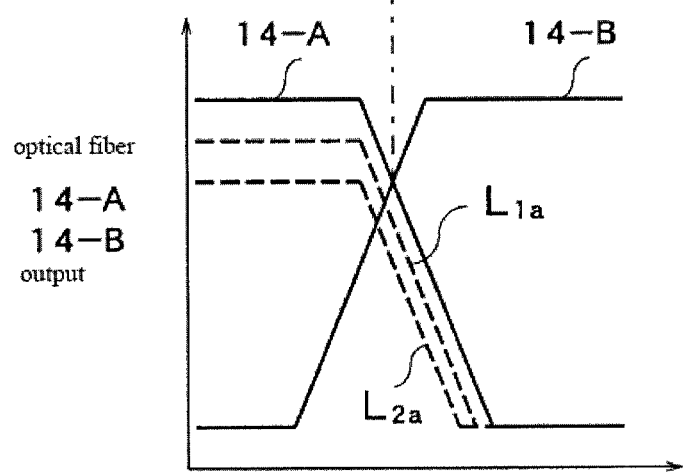

Maintaining the combination coefficient p to be 1 at this time while changing the combination coefficient k from 0 to 1 allows the output patterns to be changed from the solid lines to the broken lines such as $L_{1a}$, $L_{2a}$, and so forth as illustrated in FIG. 19(b) and enables the output levels to be attenuated at a high resolution. Even if the combination coefficient at this time is 1 and the output of the optical fiber 14-A is 0, narrowing of the wavelength band such as that described by FIG. 3 does not occur because voltage is applied by the third pattern C to the pixels in region R1.

Figure 19C:
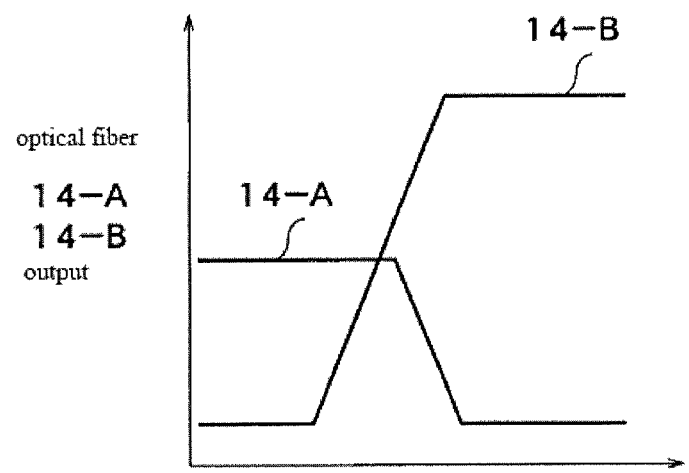

Also in this case, gradually lowering the combination coefficient p from 1 allows high resolution control of one pixel or less for wavelengths in switched positions in a similar manner as that described in FIG. 18. For example, when k=0.5 and p=0.5, the output of optical fiber 14-A and 14-B become that illustrated in FIG. 19(c). Here, when reflected light from pixels where pattern C is applied is received by different optical fiber, the residual light not received by optical fiber 14-A can be received by that optical fiber as illustrated in FIGS. 19(b) and (c).

(Output Averaging Process)

Figure 20A:
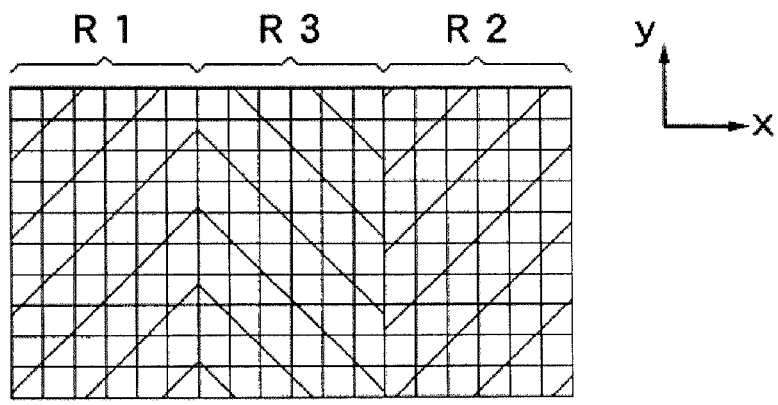
FIGS. 20(a)-(c) are diagrams illustrating wavelength control that averages output by applying a combined pattern in accordance with one or more embodiments of the present invention.
Figure 20B:
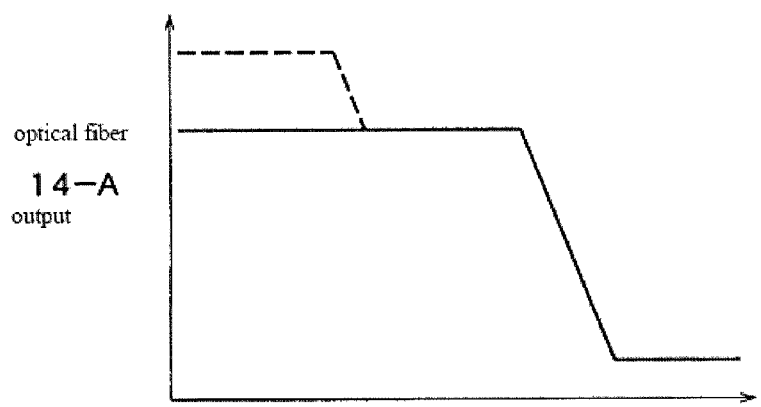

This case also has optical fiber in which reflected light that corresponds to pattern A can be received as 14-A, and optical fiber in which reflected light that corresponds to pattern B can be received as 14-B. In FIG. 20, regions of the LCOS element 17A are neighboring first, second, and third regions R1, R2, and R3, and all are regions that have a continuous plurality of pixels in the x-axis direction and all pixels in the y direction. Furthermore, a fourth combined pattern (A+B)/2 in which the first pattern A and the second pattern B are combined and applied to the center region R3. Here, (A+B)/2 means when a combination ratio g is 0.5 in the following equation.

$$(1-g)A+gB$$

Figure 20C:
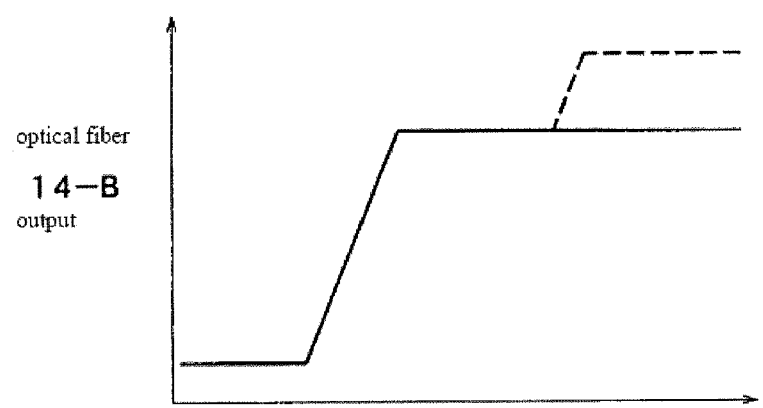

According to this, reflected light from region R3 can enter into optical fiber 14-A and 14-B at the same time at ½ the optical intensity each. Here, when applying pattern A to region R1 and pattern B to region R2 as is, as illustrated by the broken line in FIG. 20(b), the level of reflected light of the wavelength applied to region R1 and optical fiber 14-A is higher than the level of reflected light from region R3. Similarly, as illustrated in FIG. 20(c), the level of reflected light from region R2 and optical fiber 14-B is higher.

Accordingly, in order to align these levels, the fourth phase pattern D is used that reflects light in directions to which output is not applied in any direction. Pattern D is a pattern in which the maximum phase shift amount is 2π with a sawtooth wave pattern of a cycle different than the phase characteristics of patterns A and B. Furthermore, a fifth combined pattern in which the first and fourth patterns are combined for region R1 is $$(A+D)/2$$

and a sixth combined pattern in which the second and fourth patterns are combined for region R2 is $$(B+D)/2$$

and such output is applied. In this way, as illustrated by the solid line in FIG. 20(b), output of ½ the levels respectively of the light incident to regions R1 and R3 is obtained in optical fiber 14-A. Similarly, as illustrated by the solid line in FIG. 20(c), output of ½ the levels respectively of the light incident to regions R3 and R2 is obtained in optical fiber 14-B, and each output can be aligned to be constant.

When further attenuating any region from this level, a seventh combined pattern $$\{(1-k)\cdot\{(A+D)/2\}+kD\}$$

that combines the fifth combined pattern and the fourth pattern is applied to region R1.

An eighth combined pattern $$\{(1-k)\cdot\{(A+B)/2\}+kD\}$$

that combines the fourth combined pattern and the fourth pattern is applied to region R3.

A ninth combined pattern $$\{(1-k)\cdot\{(B+D)/2\}+kD\}$$

that combines the sixth combined pattern and the fourth pattern is applied to region R2. k is the combination coefficient between 0 and 1. By so doing, the respective outputs of optical fiber that receives the light of patterns A and B can be attenuated simultaneously at identical levels by gradually increasing k from 0 to 1.

Note that although the two components of the fourth combined pattern, patterns A and B, are equivalent here, it is not necessary that they have equal ratios. In this case, the fifth and sixth combined patterns will need to be changed so that the outputs are identical.

INDUSTRIAL APPLICABILITY

According to one or more embodiments of the invention as described in detail above, light of any wavelength can be selected for respective WDM signals of a multiplicity of channels by changing the various reflective characteristics and a transmissive characteristics of a wavelength selection element. Further, wavelength selective characteristics can be freely changed if using a wavelength selection element that has a plurality of bits for each wavelength. Therefore, a wavelength selective optical switch device can be used as a primary configuring element of a node having add drop functionality of a WDM light beam. While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF THE NUMERICAL REFERENCES 11, 14-1~14-$m$, 21, 29-1~29-$m$ optical fiber
12, 13-1~13-$m$, 22, 28~28-$m$ collimate lens
16, 18 lens
15, 23 wavelength dispersion element
17, 25 wavelength selection element
17A, 25A LCOS element
17B, 25B 2D electrode array liquid crystal element
17C MEMS element
27 wavelength combining element
30 setting part
31 driver

What is claimed is:

1. A wavelength selective optical switch device comprising:
   an incidence and exit part where a signal beam made of light of a multiplicity of wavelengths enters and a signal beam of a selected wavelength exits;
   a wavelength dispersion element that spatially disperses a signal beam according to the wavelength thereof and multiplexes reflected light;
   a condensing element that condenses the light dispersed by the wavelength dispersion element onto a two-dimensional plane;
   a wavelength selection element that uses a multilevel optical phased array arranged in a position to receive incident light developed on an xy-plane made of an x-axis direction and a y-axis direction perpendicular thereto developed according to a wavelength, having a multiplicity of pixels arrayed in a lattice on the xy-plane, and that cyclically changes the phase shift amount in the y-axis direction to a sawtooth wave pattern for each pixel on the x-axis; and
   a wavelength selection element drive part that drives an electrode for each pixel arrayed in an xy direction of the wavelength selection element, generates a composite wave of two or more sawtooth waves along the y-axis for all pixels on the y-axis that have an x-coordinate common with at least one pixel on the x-axis, changes a phase shift amount according to the composite wave, and reflects light of a wavelength applied to that pixel in a plurality of directions.

2. The wavelength selective optical switch device according to claim 1, wherein the wavelength selection element drive part:
   by a first pattern, controls a pixel group of a first region made of a continuous plurality of x-axis coordinates of the wavelength selection element, and of pixels of all y-coordinates that include the x-axis coordinates thereof;
   by a second pattern, controls a pixel group of a second region made of a continuous other plurality of x-axis coordinates, and of pixels of all y-coordinates that include the x-axis coordinates thereof; and
   by a first combined pattern that combines the first and second patterns, controls a pixel group of a third region that includes all y-coordinates for one x-axis coordinate between the first and second regions.

3. The wavelength selective optical switch device according to claim 1, wherein the wavelength selection element drive part:
by a second combined pattern that combines a first pattern and a third pattern, controls a pixel group of a first region made of a continuous plurality of x-axis coordinates of the wavelength selection element, and of pixels of all y-coordinates that include the x-axis coordinates thereof;
by a second pattern, controls a pixel group of a second region made of a continuous other plurality of x-axis coordinates, and of pixels of all y-coordinates that include the x-axis coordinates thereof; and
by a third combined pattern that combines the second combined pattern and the second pattern, controls a pixel group of a third region that includes all y-coordinates for one x-axis coordinate between the first and second regions.

4. The wavelength selective optical switch device according to claim 1, wherein the wavelength selection element drive part, when a combined pattern of a first and a second pattern is a fourth combined pattern, a pattern that combines the first and a fourth pattern is a fifth combined pattern, and a pattern that combines the second and the fourth pattern is a sixth combined pattern:
by the fifth combined pattern, controls a pixel group of a first region made of a continuous plurality of x-axis coordinates of the wavelength selection element, and of pixels of all y-coordinates that include the x-axis coordinates thereof;
by the sixth combined pattern, controls a pixel group of a second region made of a continuous other plurality of x-axis coordinates, and of pixels of all y-coordinates that include the x-axis coordinates thereof; and
by the fourth combined pattern, controls a pixel group of a third region that includes all y-coordinates for at least one x-axis coordinate between the first and second regions.

5. The wavelength selective optical switch device according to claim 1, wherein the wavelength selection element drive part, when a combined pattern of a first and second pattern is a fourth combined pattern, a pattern that combines the first and a fourth pattern is a fifth combined pattern, a pattern that combines the second and the fourth pattern is a sixth combined pattern, a pattern that combines the fifth combined pattern and the fourth pattern is a seventh combined pattern, a pattern that combines the fourth combined pattern and the fourth pattern is an eighth combined pattern, and a pattern that combines the sixth combined pattern and the fourth pattern is a ninth combined pattern:
by the seventh combined pattern, controls a pixel group of a first region made of a continuous plurality of x-axis coordinates of the wavelength selection element, and of pixels of all y-coordinates that include the x-axis coordinates thereof;
by the ninth combined pattern, controls a pixel group of a second region made of a continuous other plurality of x-axis coordinates, and of pixels of all y-coordinates that include the x-axis coordinates thereof; and
by the eighth combined pattern, controls a pixel group of a third region that includes all y-coordinates for at least one x-axis coordinate between the first and second regions.

6. The wavelength selective optical switch device according to claim 1, wherein:
the wavelength selection element is a LCOS element having a multiplicity of pixels arrayed two-dimensionally, and
the wavelength selection element drive part controls the voltage applied to each pixel according to wavelength selection characteristics.

7. The wavelength selective optical switch device according to claim 1, wherein:
the wavelength selection element is a liquid crystal element having a multiplicity of pixels arrayed two-dimensionally, and
the wavelength selection element drive part controls the voltage applied to each pixel according to wavelength selection characteristics.

8. The wavelength selective optical switch device according to claim 1, wherein:
the wavelength selection element is a MEMS element having a multiplicity of pixels arrayed two-dimensionally, and
the wavelength selection element drive part controls the voltage applied to each pixel according to wavelength selection characteristics.

9. A method for characteristic control of the wavelength selective optical switch device according to claim 1, the method comprising:
controlling, by a first pattern, a pixel group of a first region made of a continuous plurality of x-axis coordinates of the wavelength selection element, and of pixels of all y-coordinates that include the x-axis coordinates thereof; controls, by a second pattern, a pixel group of a second region made of a continuous other plurality of x-axis coordinates, and of pixels of all y-coordinates that include the x-axis coordinates thereof; and
controlling, by a first combined pattern that combines the first and second patterns, a pixel group of a third region that includes all y-coordinates for one x-axis coordinate between the first and second regions.

10. A method for characteristic control in a filter characteristic control method of an optical variable filter device according to claim 1, the method comprising:
controlling, by a second combined pattern that combines a first pattern and a third pattern, a pixel group of a first region made of a continuous plurality of x-axis coordinates of the wavelength selection element, and of pixels of all y-coordinates that include the x-axis coordinates thereof;
controlling, by a second pattern, a pixel group of a second region made of a continuous other plurality of x-axis coordinates, and of pixels of all y-coordinates that include the x-axis coordinates thereof; and
controlling, by a third combined pattern that combines the second combined pattern and second pattern, a pixel group of a third region that includes all y-coordinates for one x-axis coordinate between the first and second regions.

11. A method for filter characteristic control of an optical variable filter device according to claim 1, when a combined pattern of a first and a second pattern is a fourth combined pattern, a pattern that combines the first and a fourth pattern is a fifth combined pattern, and a pattern that combines the second and the fourth pattern is a sixth combined pattern, the method comprising:
controlling, by the fifth combined pattern, a pixel group of a first region made of a continuous plurality of x-axis coordinates of the wavelength selection element, and of pixels of all y-coordinates that include the x-axis coordinates thereof;
controlling, by the sixth combined pattern, a pixel group of a second region made of a continuous other plurality of x-axis coordinates, and of pixels of all y-coordinates that include the x-axis coordinates thereof; and controlling, by the fourth combined pattern, a pixel group of a third region that includes all y-coordinates for at least one x-axis coordinate between the first and second regions.

12. A method for filter characteristic control of an optical variable filter device according to claim 1, when a combined pattern of a first and second pattern is a fourth combined pattern, a pattern that combines the first and a fourth pattern is a fifth combined pattern, a pattern that combines the second and the fourth pattern is a sixth combined pattern, a pattern that combines the fifth combined pattern and the fourth pattern is a seventh combined pattern, a pattern that combines the fourth combined pattern and the fourth pattern is an eighth combined pattern, and a pattern that combines the sixth combined pattern and the fourth pattern is a ninth combined pattern, the method comprising:

controlling, by the seventh combined pattern, a pixel group of a first region made of a continuous plurality of x-axis coordinates of the wavelength selection element, and of pixels of all y-coordinates that include the x-axis coordinates thereof;

controlling, by the ninth combined pattern, a pixel group of a second region made of a continuous other plurality of x-axis coordinates, and of pixels of all y-coordinates that include the x-axis coordinates thereof; and controlling, by the eighth combined pattern, a pixel group of a third region that includes all y-coordinates for at least one x-axis coordinate between the first and second regions.

13. A wavelength selective optical switch device comprising:

an incidence part where a signal beam made of light of a multiplicity of wavelengths enters;

a wavelength dispersion element where a signal beam that has entered from the incidence part is spatially dispersed according to the wavelength thereof;

a first condensing element that condenses the light dispersed by the wavelength dispersion element onto a two-dimensional plane;

a wavelength selection element that uses a multilevel optical phased array arranged in a position to receive incident light developed on an xy-plane made of an x-axis direction and a y-axis direction perpendicular thereto developed according to a wavelength, having a multiplicity of pixels arrayed in a lattice on the xy-plane, and that cyclically changes the two dimensional phase shift characteristic of each pixel to a sawtooth wave pattern;

a wavelength selection element drive part that drives an electrode for each pixel arrayed in an xy direction of the wavelength selection element, generates a composite wave of two or more sawtooth waves along the y-axis for all pixels on the y-axis that have an x-coordinate common with at least one pixel on the x-axis, changes a phase shift amount according to the composite wave, and transmits light of a wavelength applied to that pixel in a plurality of directions;

a second condensing element that condenses the light of each wavelength transmitted by the wavelength selection element; and a wavelength combining element that respectively combines dispersed light condensed by the second condensing element for each incident position.

14. The wavelength selective optical switch device according to claim 13, wherein the wavelength selection element drive part:

by a first pattern, controls a pixel group of a first region made of a continuous plurality of x-axis coordinates of the wavelength selection element, and of pixels of all y-coordinates that include the x-axis coordinates thereof;

by a second pattern, controls a pixel group of a second region made of a continuous other plurality of x-axis coordinates, and of pixels of all y-coordinates that include the x-axis coordinates thereof; and by a first combined pattern that combines the first and second patterns, controls a pixel group of a third region that includes all y-coordinates for one x-axis coordinate between the first and second regions.

15. The wavelength selective optical switch device according to claim 13, wherein the wavelength selection element drive part:

by a second combined pattern that combines a first pattern and a third pattern, controls a pixel group of a first region made of a continuous plurality of x-axis coordinates of the wavelength selection element, and of pixels of all y-coordinates that include the x-axis coordinates thereof;

by a second pattern, controls a pixel group of a second region made of a continuous other plurality of x-axis coordinates, and of pixels of all y-coordinates that include the x-axis coordinates thereof; and by a third combined pattern that combines the second combined pattern and the second pattern, controls a pixel group of a third region that includes all y-coordinates for one x-axis coordinate between the first and second regions.

16. The wavelength selective optical switch device according to claim 13, wherein the wavelength selection element drive part, when a combined pattern of a first and second pattern is a fourth combined pattern, a pattern that combines the first and a fourth pattern is a fifth combined pattern, and a pattern that combines the second and the fourth pattern is a sixth combined pattern:

by the fifth combined pattern, controls a pixel group of a first region made of a continuous plurality of x-axis coordinates of the wavelength selection element, and of pixels of all y-coordinates that include the x-axis coordinates thereof;

by the sixth combined pattern, controls a pixel group of a second region made of a continuous other plurality of x-axis coordinates, and of pixels of all y-coordinates that include the x-axis coordinates thereof; and by the fourth combined pattern, controls a pixel group of a third region that includes all y-coordinates for at least one x-axis coordinate between the first and second regions.

17. The wavelength selective optical switch device according to claim 13, wherein the wavelength selection element drive part, when a combined pattern of a first and a second pattern is a fourth combined pattern, a pattern that combines the first and a fourth pattern is a fifth combined pattern, a pattern that combines the second and the fourth pattern is a sixth combined pattern, a pattern that combines the fifth combined pattern and the fourth pattern is a seventh combined pattern, a pattern that combines the fourth combined pattern and the fourth pattern is an eighth combined pattern, and a pattern that combines the sixth combined pattern and the fourth pattern is a ninth combined pattern:

by the seventh combined pattern, controls a pixel group of a first region made of a continuous plurality of x-axis coordinates of the wavelength selection element, and of pixels of all y-coordinates that include the x-axis coordinates thereof;

by the ninth combined pattern, controls a pixel group of a second region made of a continuous other plurality of x-axis coordinates, and of pixels of all y-coordinates that include the x-axis coordinates thereof; and by the eighth combined pattern, controls a pixel group of a third region that includes all y-coordinates for at least one x-axis coordinate between the first and second regions.

18. The wavelength selective optical switch device according to claim 13, wherein:

the wavelength selection element is a LCOS element having a multiplicity of pixels arrayed two-dimensionally, and the wavelength selection element drive part controls the voltage applied to each pixel according to wavelength selection characteristics.

19. The wavelength selective optical switch device according to claim 13, wherein:

the wavelength selection element is a liquid crystal element having a multiplicity of pixels arrayed two-dimensionally, and the wavelength selection element drive part controls the voltage applied to each pixel according to wavelength selection characteristics.

20. A method for characteristic control of the wavelength selective optical switch device according to claim 13, the method comprising:

controlling, by a first pattern, a pixel group of a first region made of a continuous plurality of x-axis coordinates of the wavelength selection element, and of pixels of all y-coordinates that include the x-axis coordinates thereof;

controlling, by a second pattern, a pixel group of a second region made of a continuous other plurality of x-axis coordinates, and of pixels of all y-coordinates that include the x-axis coordinates thereof; and controlling, by a first combined pattern that combines the first and second patterns, a pixel group of a third region that includes all y-coordinates for one x-axis coordinate between the first and second regions.

* * * * *